Jan. 6, 1970 J. M. MALJANIAN 3,487,482
FUEL CONTROL
Filed Nov. 29, 1967 6 Sheets-Sheet 1

INVENTOR
JOHN M. MALJANIAN
BY Radford W. Luther
ATTORNEY

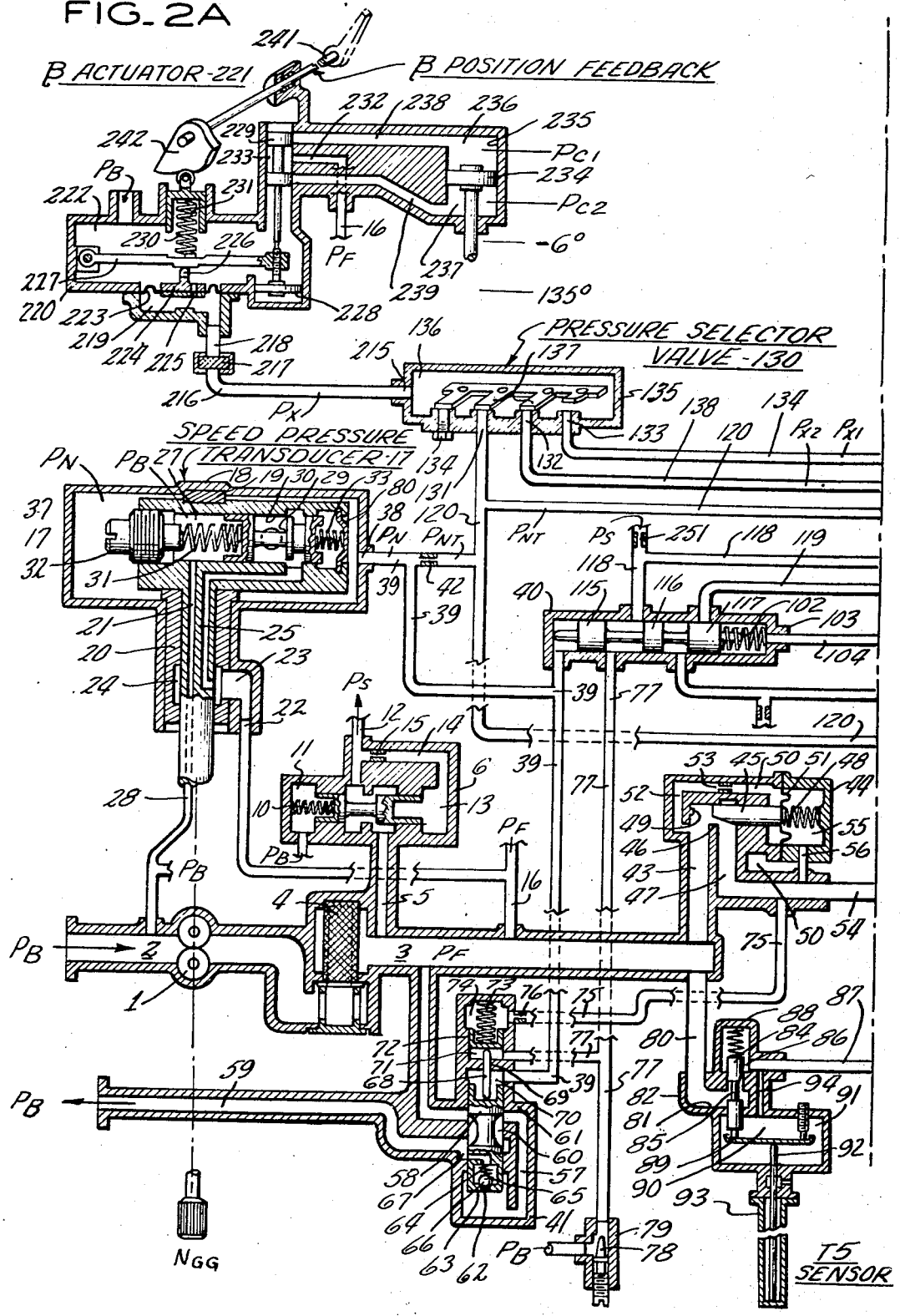

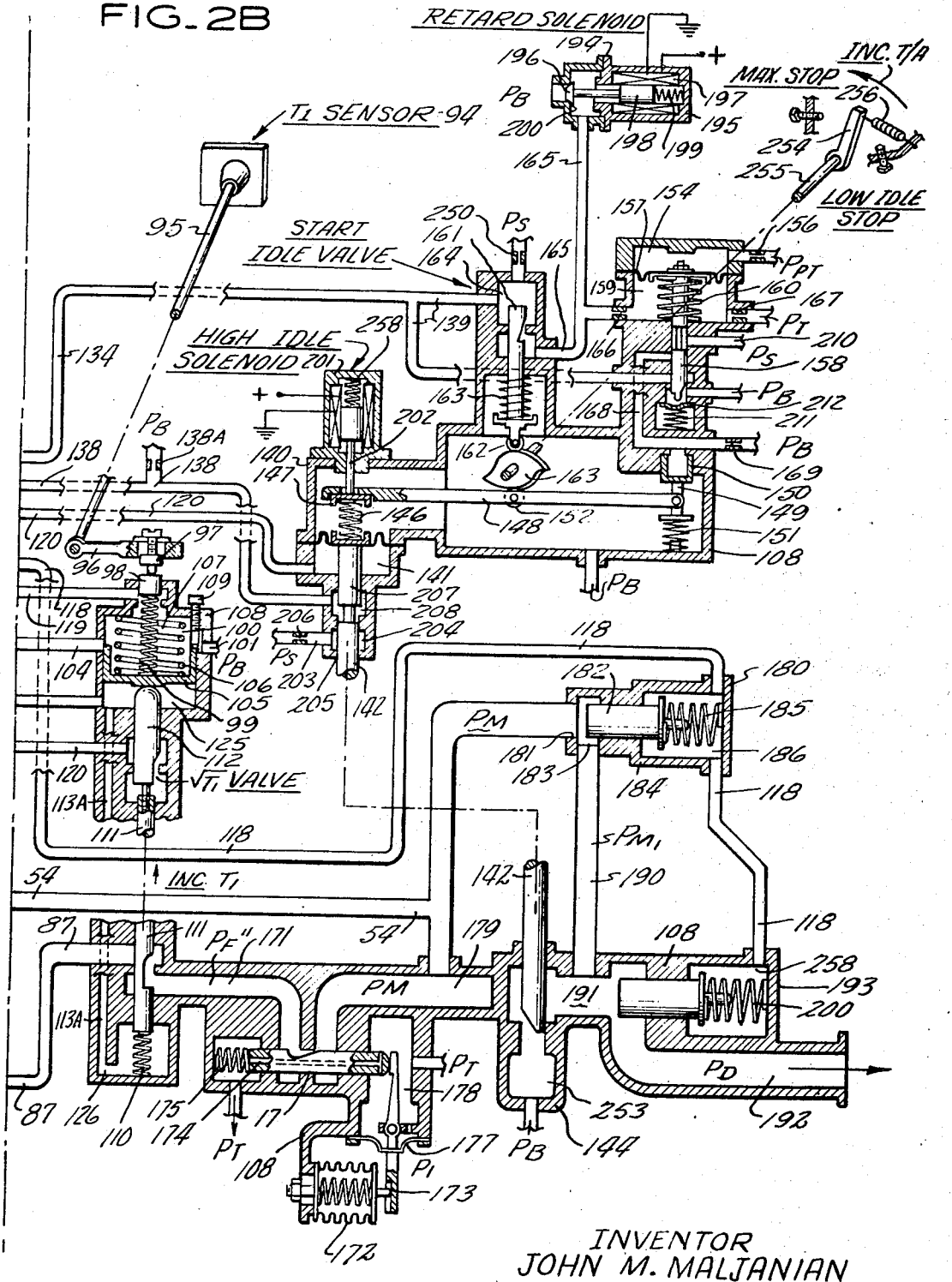

Jan. 6, 1970        J. M. MALJANIAN        3,487,482
FUEL CONTROL
Filed Nov. 29, 1967        6 Sheets-Sheet 4
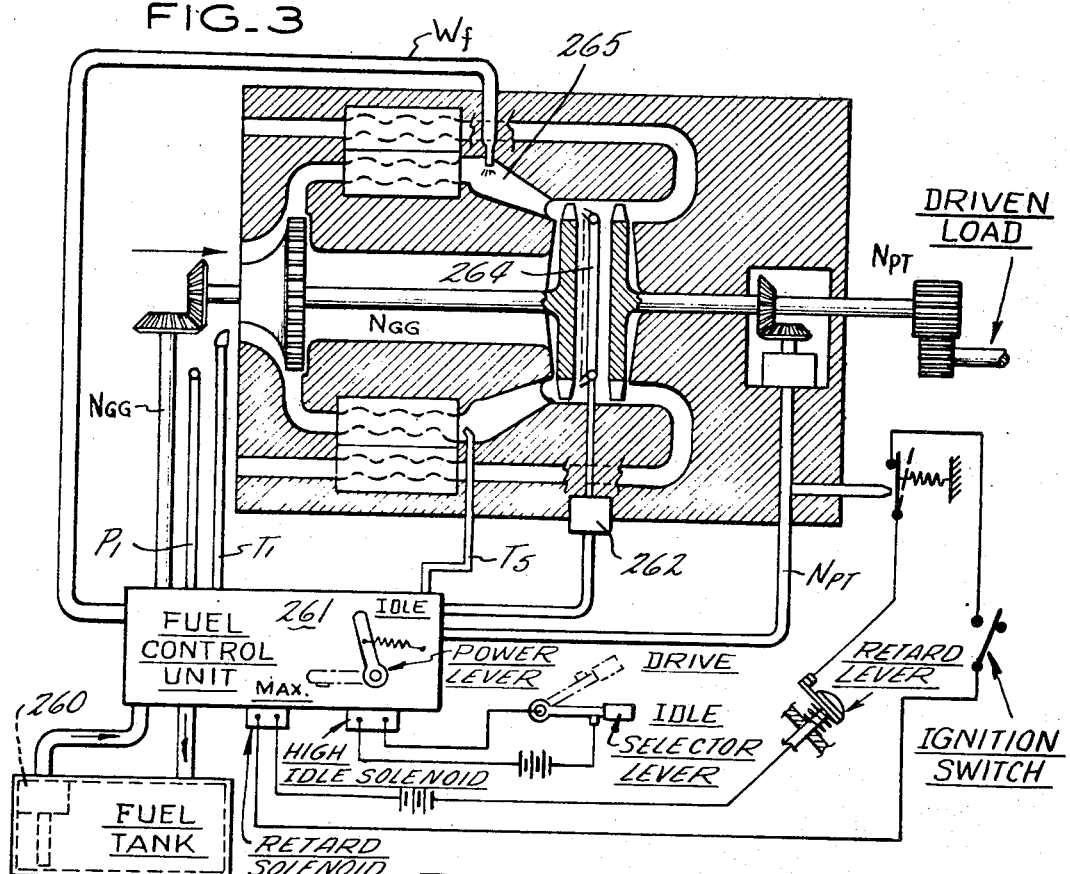
FIG_3
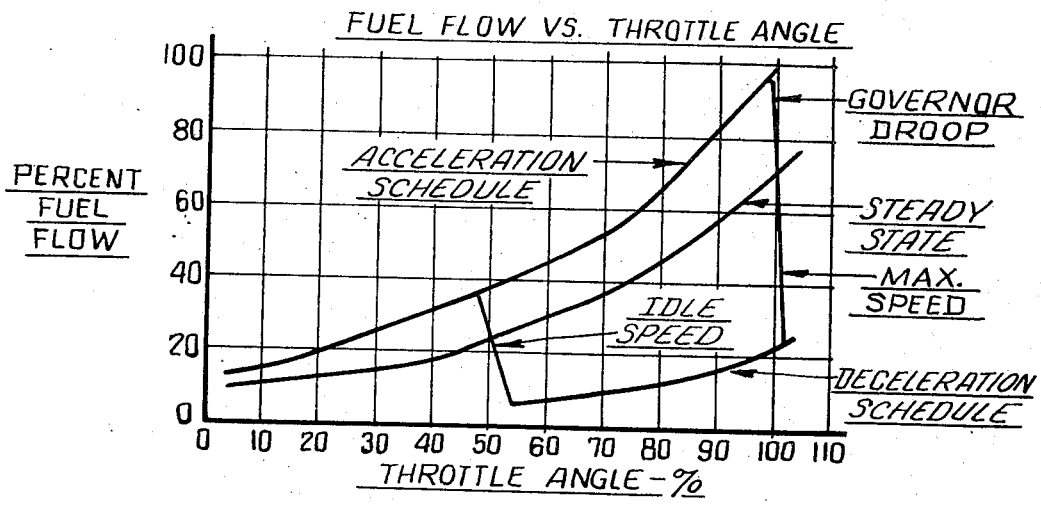
FIG_10
INVENTOR
JOHN M. MALJANIAN
BY Radford W. Luther
ATTORNEY

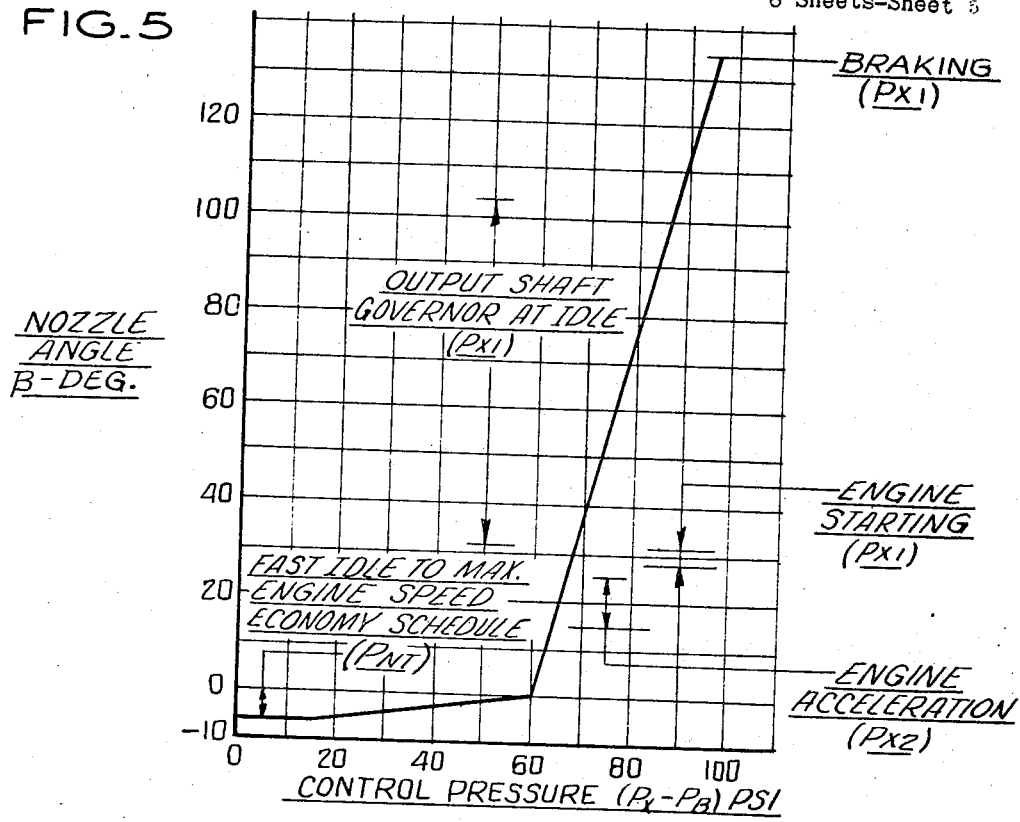
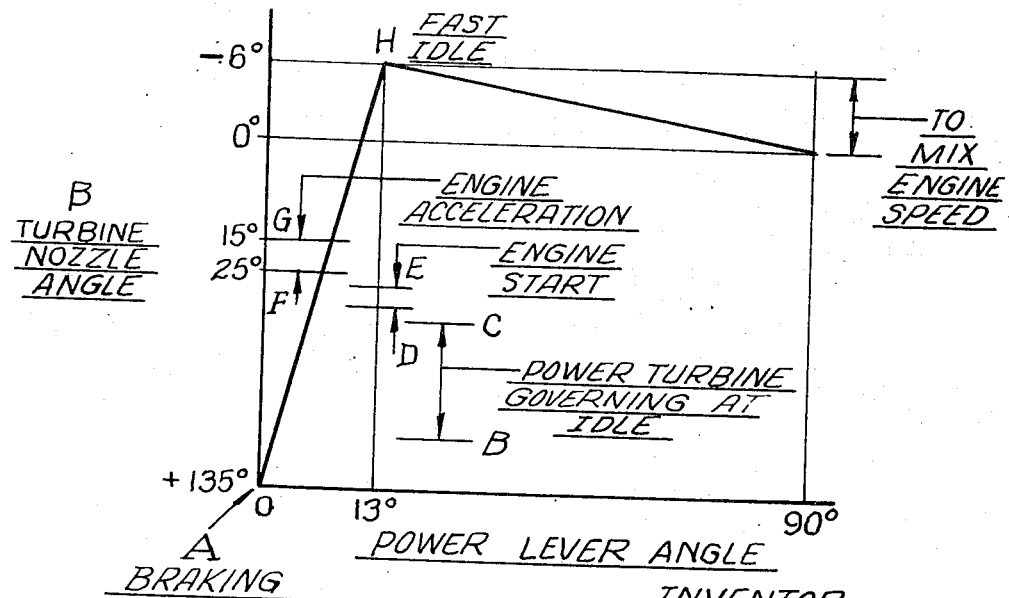

Jan. 6, 1970  J. M. MALJANIAN  3,487,482
FUEL CONTROL
Filed Nov. 29, 1967  6 Sheets-Sheet 6

INVENTOR
JOHN M. MALJANIAN
BY Radford W Luther
ATTORNEY

United States Patent Office 3,487,482
Patented Jan. 6, 1970

3,487,482
FUEL CONTROL
John M. Maljanian, Newington, Conn., assignor to Evans Chandler Inc., West Hartford, Conn., a corporation of Delaware
Filed Nov. 29, 1967, Ser. No. 686,522
Int. Cl. F02c *1/06, 9/02, 7/10*
U.S. Cl. 60—39.16
13 Claims

ABSTRACT OF THE DISCLOSURE

A fuel and speed control for a regenerative gas turbine in which compressor discharge pressure, compressor pressure ratio and turbine inlet temperature are scheduled but not measured, where the fuel metering operation is based on a hydraulically computed composite function of gas generator speed, compressor inlet temperature, ambient pressure and regenerator discharge temperature. Where the speed governor simultaneously generates a hydraulic pressure as a function of sensed gas generator speed compares it with throttle set speed and transmits an error signal for closed loop speed control. Also the engine power turbine variable geometry nozzle is simultaneously integrally positioned with the fuel metering device and speed setting governor to provide maximum cruise economy as well as start, idle, acceleration and brake angles responsive to a computed hydraulic signal.

BACKGROUND OF THE INVENTION

This invention pertains to a fuel control system for operation of a gas turbine engine utilizing in combination a regenerator and a variable turbine nozzle system to produce low specific fuel consumptions in orders of magnitude comparable to diesel engines.

The general problem associated with the control of gas turbine engines with a regenerator and a variable turbine nozzle system is the adjustment of the fuel flow to the combustion chamber which is brought about by the heat added by the regenerator to the air stream entering the combustion chamber and the simultaneous positioning of the power turbine nozzles responsive to selected engine operating parameters to maintain maximum engine performance.

As shown in FIG. 1, the engine to which the improved fuel management and turbine nozzle control system apply comprises an air compressor driven by a compressor turbine directly connected to the compressor. Compressed air flowing from the compressor to the combustor passes through the regenerator where it receives heat from the exhaust gases flowing therethrough. The combustor receives heated compressed air from the regenerator and is simultaneously supplied with fuel at a flow rate $W_F$ from the fuel control unit as shown in FIGS. 2 and 3. The gases generated by the combustion of the fuel in the combustor flow through the power turbine variable nozzles to the primary power turbine. The primary power turbine PT is a free power turbine interposed in series fluid flow relation between the variable nozzle and the return flow path to the regenerator. The free power turbine generates the power output of the engine which may be used to propel a ground vehicle, such as a truck or tank.

As shown in FIG. 1, air enters the engine from the circumambient atmosphere (Station 1) through an air flow silencer and flows successively through the compressor and regenerator to the combustor; the gases generated in the chamber of the combustor flow to the compressor turbine and then to the variable nozzles where the variable nozzles direct the gas flow through the power turbine to the regenerator from where the gas is exhausted into the circumambient atmosphere. The numerals 1–13 indicate successive stations in the fluid flow path from the air inlet Station 1 to exhaust gas outlet Station 13, as clearly indicated in FIG. 1.

Referring to FIG. 1, the following is an analysis of the functions and operations of the elements of the turbine engine to which the subject fuel control of engine applies.

Air is drawn into the compressor at Station 1 at pressure $P_1$ and temperature $T_1$ and leaves the compressor rotor at Station 3 at a higher compressor discharge pressure and temperature $P_3$ and $T_3$; the air from Station 3 passes to Station 4 and then through the regenerator to Station 5. In the regenerator, the compressed air receives heat from counterflowing hot gases from the power turbine PT exhaust.

At Station 6, the air which has now been heated to temperature $T_5$ by the regenerator enters the combustor where additional heat is added by burning fuel $W_F$. The heated air leaves the combustor and enters the compressor turbine at Station 7 at a temperature $T_7$. The heated air expands through the compressor turbine doing work thereon and leaves it at Station 7A with the pressure and temperature $P_{7A}$ and $T_{7A}$.

The compressor turbine is directly coupled to the compressor and the combination of these two with the regenerator and combustor is referred to as the "gas generator" portion of the engine.

The hot gases from the gas generator enters the variable nozzle at pressure $P_{7A}$ and temperature $T_{7A}$. The variable nozzles direct the gas flow to the power turbine where the gas expands to exhaust pressure and temperature $T_9$ and $P_9$ at Station 9.

During the expansion through the free turbine, PT usually referred to as the "free power turbines" useful work is done and this work may be extracted through a reduction gear coupled to the power output shaft.

The exhaust gas from Station 9 is now passed through the regenerator where it gives up heat to the counterflowing compressed air from the compressor. The spent gas is finally exhausted from the regenerator outlet 12 to the circumambient exhaust of the engine at Station 13.

There are two particular problems that arise in the control of a gas turbine engine using in combination a regenerator and a variable turbine power nozzle system.

The first problem is that the fuel flow to the combustion chamber must be modified in accordance with the temperature of the air leaving the regenerator at Station 5.

In a simple gas turbine engine, the compressor stall or surge limit represents the top limitation imposed on the turbine. The compressor map of each particular compressor presents a surge limit line which is the locus of the maximum compressor pressure ratio at which the engine can operate without stalling or surging the compressor. Each value of corrected speed represented on the compressor surge limit curve has a corresponding turbine inlet parameter, compressor pressure ratio and corrected fuel flow. Thus, it is necessay to compute a fuel flow for a given set of turbine operating conditions utilizing the above referenced parameters to establish a fuel flow that will avoid compressor surge.

The second problem is to coordinate a finite value of power turbine nozzle angle for each metered fuel flow and power lever angle setting to establish the maximum efficiency of the power turbine for a given operating condition.

SUMMARY OF THE INVENTION

This invention pertains to automatic fuel and speed control apparatus for regenerative gas turbine engines and particularly gas turbines adapted for use with ground vehicles such as trucks, automobiles and tanks.

The invention is particularly applicable to continuous combustion gas turbine engines. Such engines usually include an air inlet, an air compressor, a combustion chamber, a free power turbine and a regenerator for receiving discharged combustion gases and transferring a portion of the heat of the discharged gases to the compressed air entering the combustion chamber. This invention concerns apparatus to control the engine speed and power by regulating the metered fuel supply responsive to a function of a manual control and several engine operating variables including engine inlet air temperature and pressure, compressor speed, regenerator discharge temperature, turbine nozzle angle, and other engine operating conditions.

Owing to structural and metallurgical limitations, engines of the type referred to cannot be safely operated at speeds and temperatures exceeding predetermined limiting values; but for maximum economy of operation, both engine speed and temperature must be maintained at or near those limiting values. On the other hand, while engine speed is a critical factor in the engine performance, the engine cannot be operated at maximum speed under all operating conditions. Fuel and speed control apparatus should therefore enable the operator to vary torque, speed and power as desired from a required minimum to a predetermined limit of speed and power.

The value of engine speed corresponding to a given value of fuel flow varies as a function of the speed of the engine compressor, pressure and temperature of the engine inlet air, and a wide variety of other factors. Also, the maximum fuel flow to a gas turbine engine is limited by the maximum permissible compressor ratio of the air compressor that results from the fuel flow under any combination of compressor speed and engine inlet air temperature and pressure and rate of air flow through the engine. Therefore, for proper regulation of engine operation and to avoid compressor stall, it is not feasible to rely upon automatic regulation of fuel flow as a function of variables which do not include the factors of compressor speed, compressor inlet temperature, compressor inlet pressure and regenerator discharge temperature.

Another important requirement of a satisfactory fuel and speed control is ability to accelerate the engine at maximum rate without causing compressor stall, and to decelerate the engine at a maximum rate without causing burner blow-out. Accordingly, one of the primary objects of this invention is to provide a fuel and speed control system having means for maintaining the speed of the compressor at definite values for particular selected positions of the engine power control lever with means for making the necessary correction in fuel flow to the compressor turbine by sensing the temperature of the regenerator discharge air flow and correcting the fuel flow in the control as a function of this temperature.

Another object of this invention is to provide a control apparatus comprising in a single self-contained package, a fuel metering and control system, and a power turbine nozzle positioning control; each system comprising a series of component coordinated hydraulic devices coacting to provide a regulated fuel delivery to the engine; said devices being collectively responsive to compressor inlet temperature, regenerator discharge temperature, compressor speed, power lever position, and altitude.

Another object of this invention is to provide a control apparatus comprising an integrated fuel pump, fuel control, and turbine nozzle actuation control for use with a regenerative automotive gas turbine having variable position power turbine nozzles.

Another object of this invention is to provide a control mechanism wherein the fuel flow acceleration scheduling system is capable of adjusting the fuel flow schedules to closely approximate theoretical fuel requirements while compensating for a variable regenerative heat input to the air flow entering the compressor combustor.

Another object of this invention is to minimize fuel temperature rise across the fuel pump and limit the turbine nozzle actuator size by use of a small pump.

Another object of this invention is to provide a control apparatus having a fail safe arrangement whereby failure of any control component will not cause damage to the engine.

Another object of this invention is to provide fuel and speed control in which the torque output of the free power turbine of the engine is controlled by the position of the free turbine power nozzles wherein the position of the nozzles is scheduled in accordance with throttle lever angle, corrected gas generator compressor speed, and set speed error.

Other objects of this invention are to provide a fuel and speed control system embodying the following novel features:

(1) A fuel pump, fuel control and power turbine nozzle position control apparatus which is contained in a single unitary control package with a power lever, drive selector lever and retard lever for operation under all conditons of environment, speed and altitude.

(2) Means to provide for automatic starting to a preselected fuel flow schedule to free power turbine speed.

(3) Means for automatically providing for maximum acceleration of the engine from one power lever setting to another without causing compressor surge.

(4) Means to provide for an increase in the idle speed condition upon an indication of an impending extraction of higher power from the turbine.

(5) Means to provide steady-state operation of the engine with automatic compensation for variation in engine inlet temperature and pressure, and changes in condition of the regenerator discharge temperature, including means for automatically providing for maximum deceleration of the engine from any given power lever setting to any lower power lever setting.

(6) Means to provide for braking of the power turbine by positioning the power turbine nozzle angles responsive to a retard signal.

Further objects of the invention are to provide an improved fuel and speed control apparatus for a gas turbine engine having a free power turbine wherein the engine is equipped with a regenerator and a variable geometry power turbine nozzle system which embodies the following novel features:

(1) A pump, a fuel control and a turbine nozzle actuation system contained in a single self-contained package, each system comprising a series of coordinated hydraulic components for supplying high pressure metered flow to the combustor and to the turbine nozzle actuator; a metering system to control engine fuel supply during starting, acceleration and to maintain a steady-state gas generator speed selected from a governing range, and a computer to schedule variable nozzle angle as a function of power lever position.

(2) A control apparatus which comprises a series of devices that measure compressor inlet temperature, compressor inlet pressure, regenerator temperature and gas generator speed to position a metering valve in accordance with a preselected composite function of these parameters to thereby maintain a preselected value of gas generator speed.

(3) A control apparatus which functions so that the position of the variable angle power turbine nozzle can be selected to provide a braking effect on the power turbine when a retard function is indicated.

(4) A control apparatus which functions with override devices that override speed and temperature controls upon signal from the power turbine speed indicator to prevent the power turbine from operating at excessive speeds.

(5) A control apparatus which functions so that the position of the variable power turbine nozzle may be adjusted independent of the gas generator speed to provide maximum engine operating efficiency, particularly in the engine normal steady-state operating range.

(6) A control apparatus which functions so that the engine can be positioned from a low idle speed to an increase idle speed upon an appropriate preselected signal to provide an increased idle speed in anticipation of the application of a power requirement to the free power turbine.

With these and other objects in view which may be incident to the improvements of the instant control, the invention consists of the combination and arrangements of elements hereinafter described and illustrated.

Many other advantages and features of this invention will become manifest to those versed in the art upon making reference to the description which follows.

DESCRIPTION OF THE DRAWINGS

The following is a brief description of the drawings accompanying the detailed description of the instant invention.

FIGURES 2A and 2B shows somewhat diagrammatically a control apparatus embodying the principles of the instant invention.

FIGURE 3 shows somewhat diagrammatically the engine of FIGURE 1 with the associated control apparatus of FIGURE 2 operating in conjunction with a boost pump and manual control levers.

FIGURES 4 through 10 inclusive are diagrams of certain operating characteristics of the apparatus shown in FIGURE 2.

DESCRIPTION OF THE PREFERRED EMBODIMENTS

Broadly comprehended, the fuel supply and control system of the instant invention as herein disclosed comprises the concepts of a hydromechanical fuel metering system and a variable geometry power turbine nozzle system which in combination schedule the metered flow to the gas generator and direct the gas stream to the power turbine in accordance with the requirements of maximum engine performance.

We now proceed to consider how the fuel flow to the gas generator turbine is related to the gas generator turbine inlet gas temperature $T_7$ and other engine operating parameters. This analysis is given to facilitate an understanding of the problems solved by the instant invention and is therefore somewhat simplified. Thus we have neglected all secondary effects due to engine efficiency, heat loss due to radiation, etc., but the basic conclusions are not thereby affected.

Figure 1:
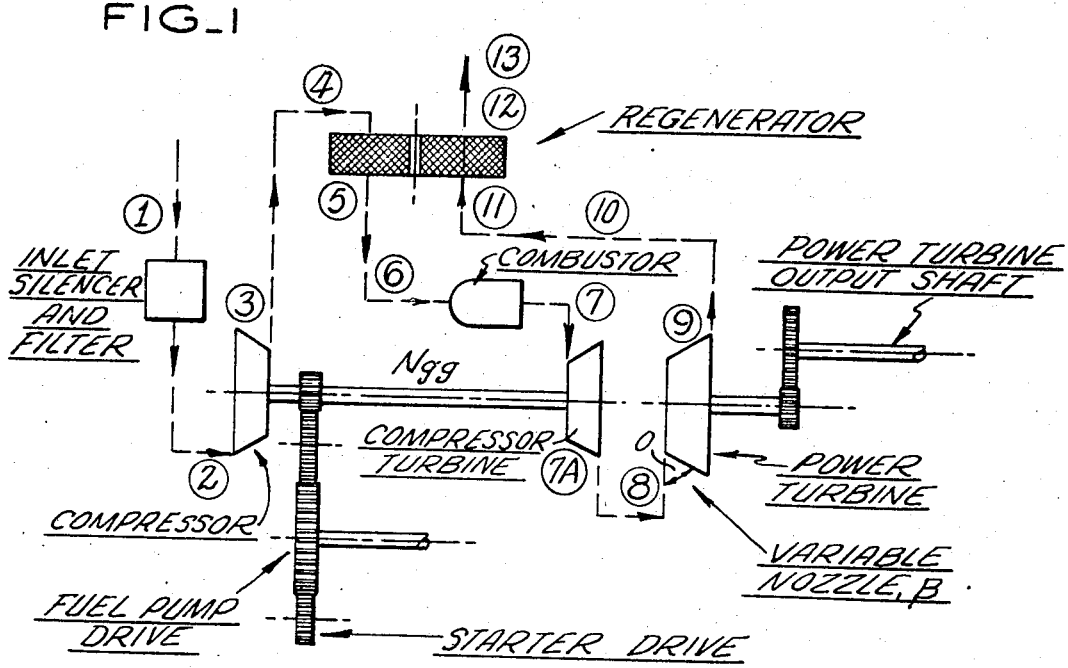
FIGURE 1 is a schematic diagram of the flow patterns of a regenerative gas turbine engine incorporating variable angle power turbine nozzles.

In a simple gas turbine engine, the engine variables can be expressed in terms of the following quantities:

$\frac{P_3}{P_1} =$ Compressor ratio $W_A\sqrt{T_1} =$ Corrected air flow $\frac{N}{T_1} =$ Corrected engine speed $T_7/T_1 =$ Corrected turbine inlet temperature $W_F/P_1\sqrt{T_1} =$ Corrected fuel flow The letters P, W, N, T, respectively symbolize pressure, flow, speed and temperature; subscript A and F symbolize air and fuel; and numerical subscripts correspond to the circled numerical stations on the schematic of the regenerative engines shown in FIG. 1.

Figure 8:
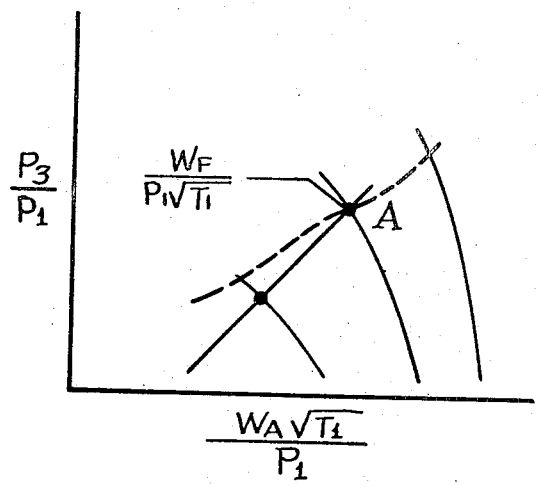

The inputs (i.e. control parameters) of the instant control system are:

(1) Compressor inlet pressure $P_1$
(2) Compressor inlet temperature $T_1$
(3) Gas generator speed NGG
(4) Compressor discharge pressure $P_3$
(5) Regenerator discharge temperature $T_5$
(6) Compressor air flow $W_A$
(7) Metered fuel flow $W_F$
(8) Turbine inlet temperature $T_7$
(9) Power turbine speed $N_{PT}$
(10) Power lever angle PLA
(11) Power turbine nozzle angle $\beta$ The performance of a simple gas turbine engine can be displayed in a single set of curves such as those shown in FIG. 8.

The dotted line in FIGURE 8 represents the surge limits of the compressor which is the locus of the maximum pressure ratio at which the engine can operate without stalling or surging the compressor.

The point A in FIG. 8 is at the intersection of the surge limit and a line of constant corrected speed $-N/\sqrt{T_1}$. To the point A there also corresponds a turbine inlet temperature parameter $(T_7/T_1)$, a compressor pressure ratio $(P_3/P_1)$ and a corrected fuel flow $(W_F/P_1\sqrt{T_1})$.

Figure 9:
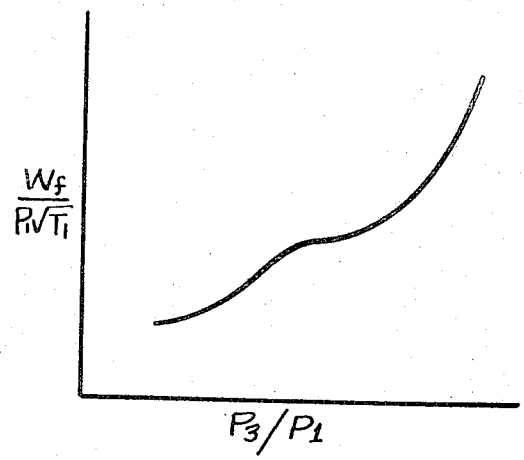

It is apparent that to avoid compressor surge for every value of corrected fuel flow along the compressor surge line, there corresponds a compressor pressure ratio $P_3/P_1$, as shown in FIG. 9. Thus, the maximum permissible fuel flow to the gas generator is expressed by:

$$\frac{W_F}{P_1\sqrt{T_1}} = f\left(\frac{P_3}{P_1}\right) \tag{1}$$

In a regenerative engine, a great deal of heat extracted from the exhaust gas is added to the air stream ahead of the combustor. The fuel control system must compensate for this added energy by reducing the fuel admitted to the combustor in proportion to the temperature of the air leaving the regenerator.

The flow of fuel to the combustor can be expressed as being made up of two parts in accordance with the equation:

$$W_F = W_{FA} + W_{EQ} \tag{2}$$

Where $W_{FA}$ represents the actual fuel flow, and $W_{EQ}$ represents equivalent flow corresponding to the heat recovered from the regenerator.

The temperature rise in the combustor is expressed in accordance with the equation:

$$(T_7 - T_5) = \frac{W_{FA}}{W_A} \cdot \frac{H}{C_p} \tag{3}$$

Where H is the heating value of the fuel, and $C_p$ is the specific heat of air at constant pressure and $W_{FA}/W_A$ is the air-fuel ratio.

By rearranging the terms, Equation 3 can be expressed as follows:

$$\left(\frac{T_7}{T_1} - \frac{T_5}{T_1}\right) = \frac{W_{FA}}{P_1\sqrt{T_1}} \cdot \frac{P_1}{W_A\sqrt{T_1}} \cdot \frac{H}{C_p} \tag{4}$$

Let $T_5$ be the exit temperature from the regenerator (combustor inlet temperature), then the heat rise from the compressor discharge to the combustor discharge can be expressed as follows:

$$(T_7 - T_3) = (T_7 - T_5) + (T_5 - T_3) \tag{5}$$

Rearranging the terms of Equation 4 in accordance with Equation 5, Equation 4 can be expressed as follows:

$$\left(\frac{T_7}{T_1} - \frac{T_3}{T_1}\right) = \frac{W_{FA}}{P_1\sqrt{T_1}} \cdot \frac{P_1}{W_A\sqrt{T_1}} \cdot \frac{H}{C_p} + \left(\frac{T_5}{T_1} - \frac{T_3}{T_1}\right) \tag{6}$$

When the turbine flow is "choked," which occurs when the pressure ratio across the turbine exceeds about 1.89, the following relation is known to apply:

$$\frac{W_A\sqrt{T_7}}{P_1} = K_t \frac{P_3}{P_1} \tag{7}$$

By first multiplying both sides of Equation 7 by $1/\sqrt{T_1}$, then dividing by $P_1/W_A$, then squaring, we obtain:

$$\frac{T_7}{T_1} = \left[ K_t \frac{P_3}{P_1} \cdot \frac{\frac{1}{W_A\sqrt{T_1}}}{P_1} \right]^2 \quad (8)$$

Assuming ideal adiabatic compression in the compressor, the following relation is known to apply:

$$\frac{T_3}{T_1} = \left(\frac{P_3}{P_1}\right)^{\frac{\gamma-1}{\gamma}} \quad (9)$$

Where $\gamma$ denotes the ratio of specific heats $C_p/C_v$.

Substituting Equation 8 and Equation 9 into Equation 6 above, we obtain:

$$\left[ K_t \frac{P_3}{P_1} \frac{\frac{1}{W_A\sqrt{T_1}}}{P_1} \right]^2 - \left(\frac{P_3}{P_1}\right)\frac{\gamma-1}{\gamma} =$$

$$\frac{W_{FA}}{\frac{P_1\sqrt{T_1}}{W_A\sqrt{T_1}}} \cdot \frac{H}{C_p} + \frac{T_5}{T_1} - \left(\frac{P_3}{P_1}\right)\frac{\gamma-1}{\gamma}$$

$$\frac{}{P_1} \quad (10)$$

Regrouping some of the quantities, Equation 10 can be expressed as:

$$\frac{W_{FA}}{P_1\sqrt{T_1}} = f \left[\frac{P_3}{P_1} - \frac{T_5}{T_1}\right] \frac{C_p}{H} \quad (11)$$

Thus it can be seen that for each value of $P_3/P_1$ (which is a function of $N_{GG}$) the $W_{FA}$ is a function of the parameters $P_1$, $T_1$ and $T_5$.

Restated, it can be seen that in the cycle of a simple gas turbine without a regenerator, the heat rise through the compressor $(T_3-T_1)$, resulting from the heat added by the compression of the inlet air $P_1$ to $P_3$ is known for any particular compressor configuration. The magnitude of the heat rise $(T_3-T_1)$ will vary for each variation in compression ratio. Also, for each particular compressor configuration, the compression ratio is a function of the compressor speed $(N_{GG})$. Thus, using a known temperature $(T_1)$ as a base or reference, the heat rise through the compressor with reference to the base is known to be $T_3-T_1$.

When a regenerator is placed in the system, the heat added to the air flow by the regenerator will result in a reduction in the fuel flow required to operate the compressor turbine at a specified compressor speed. Hence, if the map of compressor temperature rise for a particular simple cycle compressor is known, the increase in the temperature due to the heat added by the regenerator for a particular value of compressor pressure ratio can be expressed as follows:

$$W_A(T_5-T_3)C_p = W_{FR}H \quad (12)$$

It can be seen from Equation 12 that the temperature rise through the regenerator in association with rate $W_A$ and specific heat $C_p$ of the air flow through the regenerator can be equated to a fuel flow rate $W_{FR}$ in association with the heating value $H$ of the particular fuel where the fuel flow rate $(W_{FR})$ represents the reduction in fuel flow that will result from the increase in temperatuere of the air flow caused by the regenerator. If the temperature rise through the compressor for a particular gas generator configuration without a regenerator is known, reduction in fuel flow that results from the addition of a regenerator can be expressed as follows:

$$W_{FR} = \frac{W_A(T_5-T_3)}{H} C_p \quad (13)$$

Hence, from Equation 13 it can be seen that where $W_A$, $T_5$, $C_p$ and $H$ for a particular gas turbine configuration and fuel utilized therein are known, the reduction in the fuel flow to a particular turbine resulting from the inclusion of a regenerator can be calculated. Hence, in the instant control, by utilizing the parameters $P_1$, $T_1$ and $T_5$, the control is designed to schedule metered fuel flow for a gas generator including a regenerator as a function of $T_5$. Hence, scheduling of the metered fuel flow to the instant gas generator including a regenerator can be expressed as follows:

$$W_{F(metered)} = W_F - W_{FR} \quad (14)$$

where:
$W_F$ = Fuel flow that would be required of the particular gas generator without a regenerator.

Turning now to the free power turbine (PT), it can be seen from FIG. 1 that the hot gas from the gas generator passes through the variable position nozzles located intermediate the outlet of the gas generator turbine and the inlet of the free power turbine, said hot gases enter the free power turbine PT at Station 8 and expand down to pressure $P_9$ prior to flowing to the regenerator. The regenerator is designed so that the hot gases passing therethrough have very little pressure drop and the pressure $P_9$ will be substantially equal to atmospheric pressure $P_1$.

In this analysis, we again neglect secondary effects such as efficiency and heat loss so that the basic conclusions may be clearly established.

When the hot gas from the gas generator portion of the engine at temperature $T_8$ and $P_8$ is allowed to expand freely through the power turbine down to pressure $P_1$, the kinetic energy acquired by each pound of exhaust gas is given by the expression:

$$KE = JC_p T_8 \left[ \left(\frac{P_8}{P_1}\right)^{\frac{\gamma-1}{\gamma}} - 1 \right] \text{ inch-pounds} \quad (15)$$

where:
$J$ = denotes the energy conversion factor 778 per pounds per B.t.u.
$\gamma$ = denotes ratio of specific heats $C_p/C_v$ From Equation 15 we conclude that the velocity $u$ acquired by the gas is:

$$u = \sqrt{2gJC_p T_8 \left[ \left(\frac{P_8}{P_1}\right)^{\frac{\gamma-1}{\gamma}} - 1 \right]} \text{ inches per second} \quad (16)$$

where:
$g$ = denotes the acceleration of gravity.

If this high velocity gas is directed peripherally against a turbine wheel, and directed through the turbine wheel so that its peripheral component of momentum is reversed (as is the case when the high velocity gas impinges on the blades of a stationary impulse turbine wheel), the torque $Q$ exerted on the wheel is:

$$Q = \frac{2W_A}{g} u \cdot r \quad (17)$$

where:
$r$ = is the radius at which the gas impinges
$g$ = denotes acceleration of gravity.

The above analysis represents the gas flow through a turbine wheel at rest. If the wheel is rotating so that its peripheral velocity is $v$, then the gas from the nozzles approaches the wheel peripherally with the relative velocity $(u-v)$, and its direction is reversed so that it leaves the wheel with equal relative velocity $(u-v)$.

The torque exerted on the wheel in this case is:

$$Q = \frac{2W_A}{g}(u-v)r \quad (18)$$

From the above analysis, it can be seen that when the angle of the nozzles directing the approaching of the gas stream to the turbine wheel is varied, the relative velocity $(u-v)$ is varied, and hence the torque is varied. Since it is desired to maintain the actual output torque at maximum efficiency for each particular engine operating condition, it is necessary to change the position of the power turbine variable nozzles, designated $\beta$, in order to maintain the optimum relative velocity $(u-v)$ and hence torque for maximum efficiency. The position $0°$ $\beta$ is by definition that position of the power turbine nozzles at which maximum efficiency is obtained at 100% free power turbine speed. All variable power turbine nozzle angles are established from this $0°$ $\beta$ reference.

Figure 7:
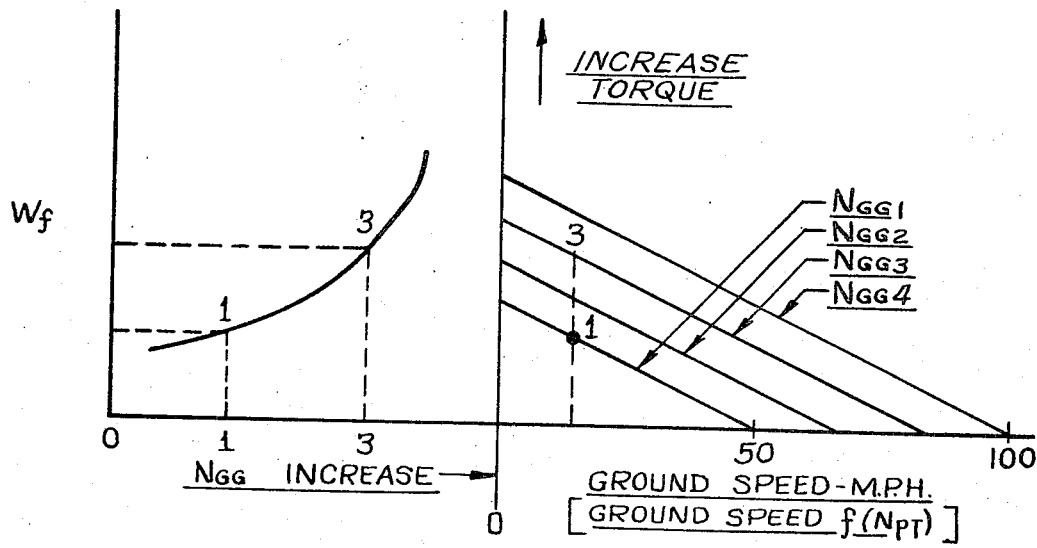

The hot gases from the gas generator exit the gas generator turbine at Station 7A and enter the free power turbine at Station 8 to thermodynamically connect the gas generator to the free power turbine in such a manner as to generate a torque output of the free power turbine as a function of the gas generator speed. Referring to FIG. 7, it can be seen that the torque applicable to each forward ground speed is a function of free turbine speed. Since the wheels of the ground vehicle directly connect to the free power turbine, the torque utilized for each forward ground speed can be varied by varying the gas generator speed.

Referring to FIG. 7, it can be seen, by way of example, that for gas generator speed $N_{GG_1}$ ① and an arbitrarily selected point designated as Station ②, a lot value of torque and corresponding low fuel flow results. Maintaining the same ground speed but increasing the gas generator speed to the value designated as Station ③ (i.e. going up a hill), it can be seen that the torque and corresponding fuel flow are increased to the values designated by Station ③, while the ground speed remains constant. Also it is to be noted at zero forward ground speed (vehicle at rest), the torque available for acceleration from the rest position can be substantially increased by increasing the gas generator speed.

Referring now to FIG. 3, the instant fuel metering and speed control mechanism comprises an integrated fuel pump 260, fuel control 261 and turbine nozzle actuation control 262 for use with a regenerative automotive gas turbine having variable position power turbine nozzles 264, and includes selected vehicle signals to which the disclosed apparatus responds to schedule fuel inputs to the engine to provide start, idle, acceleration, braking and economy range functions.

The integrated system, as shown in FIG. 3, comprises a pump 260 to supply a control system 261 with high pressure flow needed to supply metered flow to the combustor 265 and operate a nozzle position actuator 262. As shown in FIG. 2, the system also comprises a metering system 41, 83, 94, 172 and 142 to control engine fuel supply during starting, acceleration, deceleration, and to maintain a steady-state gas generator speed selected from the governed range; and a control computer 17, 40, 130 and 221 which schedules nozzle actuator position.

Fuel flow is metered to the engine in accordance with gas generator speed $N_{GG}$, compressor inlet temperature $T_1$, regenerator outlet temperature $T_5$, altitude $P_1$ and power lever angle. Power turbine nozzle position $\beta$ is scheduled in accordance with power lever angle, corrected speed $N_{GG}/\sqrt{T_1}$, set speed error, transmission "drive" signal, power turbine governor command and retarder (braking) command.

In an "ideal" engine where the effects of efficiency variation are negligible and in which the heat addition to the gas stream is limited by compressor stall, the corrected maximum fuel flow should at any fixed compressor ratio be reduced linearly with combustor inlet air temperature increases. Assuming that ideal adiabatic compression occurs in the compressor and that the turbine acts as a choked nozzle, an expression for this relationship as derived above yields Equation 11, repeated here for ease of presentation:

$$\frac{W_{FA}}{P_1 T_1} = \frac{f}{J}\left[\left(\frac{P_3}{P_1}\right) - \frac{T_5}{T_1}\frac{C_p}{H}\right] \quad (11)$$

This relationship can be approximated by a straight line plot for a desired flow schedule and a specific compressor ratio with values of $T_5/T_1$ plotted on the abscissa and points representing various temperatures and altitudes plotted to arrive at a mean position straight line plot. As shown in FIGS. 8 and 9 for each value of compressor ratio at the compressor start condition, there corresponds a value of corrected speed, thus corrected speed may replace compressor ratio as the sensed engine operating parameter.

To reproduce many desired flow schedules according to the plots of FIGS. 8 and 9 would require complex servoed computing mechanisms which can be avoided at a relatively slight sacrifice in engine performance by use of the simplified mechanism taught hereafter whereby the delivered fuel flow is a compromise and thus is slightly less than ideal for any particular percentage of gas generator speed.

The integrated system contains a positive displacement high pressure gear pump which provides fuel for engine consumption according to a pre-established control-computed fuel schedule. Additionally, the system controls the operation of the power turbine nozzle positioning system; and the control computing and servo systems. The fuel metering section varies the net effective metering area as a function of $T_5$, $N_{GG}$, $T_1$ and $P_1$ and varies the control metering head as a function of $N_{GG}$. The metering section continually meters the properly scheduled acceleration flow, and a governor is provided to bypass part of this flow to the pump inlet according to the speed error. A positive minimum deceleration flow is provided for by means of a stop. The coordinated system of hydraulic computing elements operates at high force levels to provide accurate gas generator fuel scheduling, scheduling of power turbine nozzle position as a function of corrected gas generator speed in the economy range, and selection of the optimum nozzle angles for braking, acceleration, start and idle. Hydraulic computing has been utilized to eliminate mechanical connections between components to increase accuracy and facilitate independence of adjustment. There is no compressor discharge pressure connection to the control, eliminating the possibility of diaphragm or bellows failures allowing fuel to enter the engine compressor.

Referring to FIG. 2A, fuel maintained at boost pressure $P_B$ by a boost pump (not shown) enters gear pump 1, driven by a takeoff from the compressor turbine (not shown), by way of inlet passageway 2. Fuel is discharged by pump 1 into conduit 3 through a full flow filter 4 located immediately downstream of pump 1.

Passageway 5, in fluid communication with conduit 3, delivers fluid to the servo supply regulator, shown generally at 6. Said regulator comprises a metering spool 7 disposed to cooperate with metering land 8 of regulator housing 9. Metering spool 7 is biased to the open position by helical compression spring 10 located in cavity 11 of housing 9. Cavity 11 is continuously maintained at boost pressure. Fluid crossing metering land 8 enters servo supply conduit 12 in fluid communication with chamber 13 by way of interconnected passageway 14 having a fixed area flow restriction 15 therein. Pressure in chamber 13 opposes the bias exerted against metering spool 7 by spring 10 thereby establishing a regulated pressure in servo supply conduit 12, designated $P_S$. The servo supply pressure $P_S$ in conduit 12 is ported to various elements of the control, as indicated in FIGURES 2A and 2B.

Conduit 16, in fluid communication with conduit 3, delivers fluid at regulated pump pressure $P_F$ to the speed pressure transducer, shown generally at 17, and the nozzle actuator, shown generally at 221; said speed pressure transducer comprises an outer housing 18 having fixed therein a thrust pad 19 and a ported journal sleeve 20 which supports a rotating head and shaft 21 driven at the same speed as gear pump 1. Fluid from conduit 16 enters rotating head and shaft 21 by way of passageway 22 in housing 18 which is in fluid communication with passageway 23 and annular relief 24 in journal sleeve 20. Passageway 25 in rotating head and shaft 21 permits fluid communication between annular relief 24 and inlet chamber 26. Boost pressure is similarly introduced to reference chamber 27 by means of passageway 28. Metering piston 29 is slideably disposed in axial bore 30 in the rotating head and is urged in an outboard direction by helical compression spring 31 disposed in cavity 27. Spring stop member 32 threadably engages rotating head 21 to provide a means for adjustment of the initial axial preload in spring 31 acting on piston 29. Piston 29 is urged in an inboard direction by helical compression spring 33 retained axially outwardly of piston 29 by spring retaining element 80. Fluid from inlet chamber 26 is metered across land 34 of piston 29 to chamber 26 and thence to outer cavity 37 in housing 18 by means of interconnecting radial passageway 36 in the rotating head. Nonmetered flow to cavity 37 is prevented by the substantially fluid tight fit between the outboard land of piston 29 and bore 30 in rotating head 21. As gear pump speed increases, the directly coupled rotating head speed increases to produce an increased centrifugal force, proportional to speed squared, thereby moving piston 29 in an outboard direction and increasing the annular opening between metering land 34 of piston 29 and the edge of inlet chamber 26 of bore 30. The increased annular opening results in a decreased flow restriction, thereby permitting pressure in outer cavity 37 to approach that necessary to balance the centrifugal force developed on piston 29. The function of speed squared indicative, according to the pressure generated within cavity 37 (hereinafter called the speed signal) is a function of the square of the gas generator speed and is simultaneously communicated via passageway 38 and interconnected conduit 39 to a speed pressure switch, shown generally at 40, and a metering head pressure regulator, shown generally at 41, as well as to conduit 120 via fixed restriction 42.

The enrichment valve, shown generally at 44, receives inlet flow from conduit 43 via pump discharge conduit 3. Valve 44 comprises a spool 45 axially slideably disposed in bore 46 of housing 47. Helical compression spring 48 is disposed in chamber 55 to urge valve 45 against sealing land 49 in housing 47 until fluid pressure acting on valve 45, and pressure in chamber 50 acting against diaphragm 51 overcomes the force applied to valve spool 45 by spring 48. This condition is set to occur at a preselected gas generator speed. At the preselected gas generator speed fluid in passageway 43 is transmitted to conduit 54 by way of passageway 46, thus adding to the flow of conduit 179. Conduit 54 downstream of spool 45 is in fluid communication with chamber 55 via interconnected passageway 56. Hence, the pressure in chamber 55 regulated as a function of engine speed is additive with the force exerted by spring 48 in opposing the pressure in chamber 50. Enrichment valve 44 is provided to schedule a specific increase in fuel flow at a preselected gas generator speed in accordance with the requirements to the particular gas turbine.

Metering head pressure regulator and relief valve 41 receives pump discharge flow from conduit 3 via conduit 57. Valve member 58 controls bypass flow to bypass conduit 59 which leads to a heat exchanger (not shown) and thence to pump inlet passageway 2. Valve member 58 is axially slideably disposed in bore 60 of housing 61 and has an aperature 62 in valve member end face 63 which is in fluid communication with conduit 57. Helical compression spring 64 is disposed in cavity 65 within valve member 58 to urge relief valve 66 into sealing engagement with aperature 62. When discharge pressure overcomes the force of spring 64, relief valve 66 unseats to permit flow through cavity 65 and passageway 67 to bypass conduit 59. The pressure exerted on end face 63 urges valve member 58 against pin 68 which is axially slideably disposed in bore 69 of housing 61 and against speed signal pressure in chamber 70, chamber 70 being in fluid communication with conduit 39. The end of pin 68 outboard of chamber 70 is disposed in chamber 71. Chamber 71 in fluid communication with speed pressure switch 40 via conduit 77 is connected to speed signal pressure. Pressure in conduit 77 is always less than the output pressure of servo supply regulator 6 because manually adjustable bleed 78 in housing 79 permits trim flow from conduit 77 to bleed to pump inlet passageway 2 via conduit means not shown. Pin 68 is urged against valve member 58 by piston 72 by helical compression spring 73 and the fluid pressure in cavity 74. It is apparent that bypass flow through metering head regulator 41 is reduced as valve member 58 is urged downward by compression spring 73 under the influence of an increase in the speed signal pressure or in metered fluid pressure. Metering head regulator 41 operates to hold a constant pressure drop across the variable area orifice elements.

Conduit 80 branches from pump discharge conduit 3 to deliver fuel to inlet chamber 81 of housing 82 of regenerator discharge temperature sensor valve 83. Fuel is metered across variable area metering land 84 of valve spool 85 from conduit 80 into discharge chamber 86 in fluid communication with conduit 87. Compression spring 88 confined within chamber 86 urges spool 85 into continuous contact with lever 89 pivotably disposed in cavity 90 such that spool 85 can follow angular movements of lever 89 about adjustable pivot member 91 caused by axial change in length of rod 92 which is axially restrained at the outboard end thereof by casing 93 affixed to housing 82. Rod 92 is a material having a lower coefficient of thermal expansion than casing 93 such that the metering area of land 84 decreases as temperature in the vicinity of casing 93 increases. A passageway 94 is provided in housing 82 connecting chambers 86 and 90 to permit a common fluid pressure to act upon opposite ends of spool 85 thereby negating fluid pressure effects on the position of valve 85. In operation, the regenerator fluid stream to be sensed may be within an inner conduit circumscribed by an outer annular plenum containing compressor inlet air at a much cooler temperature.

The compressor inlet temperature sensor, shown generally at 94, comproses a bimetallic spiral coil (not shown) immersed in the inlet air stream and operably connected to rotary shaft 95 suitably provided with bearings (not shown) for lateral restraint. Linkage arm 96 is secured to shaft 95 at an attitude normal thereto. A ball assembly 97 attached to arm 96 permits angular movements of arm 96 to induce linear movements of spool 98 constrained by transducer valve housing 108. Spool 98 is urged against ball assebly 97 by a small diameter compression spring 99 disposed in cavity 100 of housing 108. Said cavity 100 is concomitantly connected to boost pressure $P_B$ via passageway 101 and cavity 102 of speed pressure switch 40 via conduit 104. Valve sleeve 105 is urged away from valve spool 98 by spring 99 and large diameter compression spring 106 which bears against a fixed reference shoulder 107 of housing 108. Adjustable stop member 109 is provided to limit travel of sleeve 105 such that passageway 101 and conduit 104 will always be in unrestricted communication with cavity 100. The combined force on sleeve 105 produced by springs 99 and 106 and the boost pressure in cavity 100 is balanced by the force exerted by compression spring 110 against contoured adjustably interconnected valve members 111 and 112 in combination with the force acting on sleeve 105 by virtue of the pressure communicated to chamber 125 via conduit 120 and the pressure communicated to cavity 126 via conduit 132a. Servo supply pressure is communicated to conduit 113 via fixed restriction 114. The spool of speed switch 40 has three lands thereon designated 115, 116 and 117. Lands 116 and 117 cause conduit 113 to be dead headed at low values of speed pressure in conduit 39. At high values of speed pressure the spool shifts towards spring 102, thereby lowering the pressure in conduits 77 and 113, and increasing the pressure in conduits 118 and 119. At normal operating engine speeds, speed pressure switch 40 places conduits 113 and 119 in fluid communication with each other. Additionally, valve 98 is positioned in housing 108 to permit flow to boost via interconnected conduits 113, 119 and cavity 100 to reduce the pressure available in conduit 113 and cavity 125 and thus reduce the force opposing the force of springs 99 and 106 such that contoured valves 111 and 112 are depressed toward spring 110, thereby restricting main engine flow across valve 111 and restricting speed transducer flow entering conduit 120 at restriction 42 and flowing across the contoured land of valve 12 to boost. Valve 98 is positioned by increased compressor inlet temperature reacting with sensor 94 to move arm 96 and spool 98 away from housing 108. Cavities 125 and 126 receive the same pressure via interconnected passageway 113a thereby cancelling the pressure effect on valves 111 and 112.

Pressure selector valve 130 comprises a plurality of check valves in parallel with the downstream side thereof manifolded to provide a single outlet in series with the plurality of valves. The configuration shown provides a "spare" port 134 and a series of inlet ports 131, 132 and 133 in housing 135 having a valve seat integral therewith corresponding to each inlet port. A series of resilient valve members 137 are provided within cavity 136 formed by housing 135 such that each valve seat is sealed by a resilient member when pressure in cavity 136 exceeds that at the corresponding inlet port. Conduits 138 and 139, in fluid communication with inlet ports 132 and 133 respectively, are also in communication with various segments of governor appartus 140, as shown in FIG. 2.

Altitude bias valve, shown generally at 170, receives metered flow from valve member 111 via passageway 171 of housing 108. Evacuated bellows 172 is rigidly affixed to housing 108 at one end and pivotably mounted to lever 173 at the other end. Lever 173 pivotably mounted to housing 108 operatively engages contoured valve 174 axially slideably disposed in housing 108, the position of valve 174 being automatically adjusted according to the influence of atmospheric pressure on the outboard end of bellows 172 causing expansion or contraction thereof. Valve 174 is biased toward lever 173 by helical compression spring 175 disposed in cavity 176 of housing 108. A diaphragm 177 sealingly engages lever 173 and housing 108 to permit motion therebetween while forming a fluid tight cavity 178. Cavities 176 and 178 are referenced to tank pressure by means of conduits (not shown). The contoured surface on valve 174 is so defined as to offer an increasing restriction to metered flow from passageway 171 into passageway 179 as altitude increases. Conduit 54 receives the flow from passageway 179 to combine the flow of the two parallel metered flow branches, one branch including enrichment valve 44, and the other branch including the series flow arrangement of regenerator temperature responsive valve 83, inlet temperature responsive valve 11 and the altitude responsive valve 170.

The combined flow of conduit 54 is conducted to port 181 of a pressurizing valve, shown generally at 180. Valve member 182 is axially slideably disposed in a bore 183 in housing 184, said valve being biased toward the zero flow position by spring 185 and regulated servo pressure in cavity 186, when land 115 of the speed pressure switch blocks the passage of trim flow from conduit 118 to conduit 77. Conduit 118 also supplies fluid to bias the position of a second pressurizing valve 193 substantially identical to pressurizing valve 180.

The governor valve assembly, shown generally at 143, is positioned intermediate said pressurizing valves and conduit 190 and in series relationship with passageway 191. Speed governor valve member 142 is provided to bypass metered flow in accordance with the speed error position of valve member 142 as determined by the pressure differential across diaphragm 145 affixed to valve member 142 and by the load applied to valve member 142 by governor compression spring 146. One end of lever 148 is pivotably mounted to power turbine maximum speed governor valve member 149 which is biased against shoulder 150 of housing 108 by maximum speed reset compression spring 151 positioned intermediate valve member 149 and housing 108. Roller 152 is pivotably attached to lever 148 to engage the contoured surface of cam 153 under the influence of a tracking force supplied by spring 146. Cam 153 is positioned by means of a manually operated power lever 254 fixed to cam 153 by means of interconnected shaft 255. Clockwise rotational movement of cam 153 will cause lever 148 to pivot about valve 149 in a counterclockwise direction to cause valve member 142 to move downward until the force of spring 146 again balances the pressure load across diaphragm 145 thereby decreasing bypass flow across contoured surface 144 of valve member 142 and increasing the flow delivered to the engine. Conversely, bypass flow increases responsive to clockwise movement of lever 148 about the pivotal connection to valve 149. During any high flow power lever position of cam 153 when valve member 149 is caused to move away from shoulder 150, the pressure in cavity 141 acting on diaphragm 145, will cause valve member 142 to advance toward lever 148 until the pressure in cavity 141 and the force of governor spring 146 balances, thereby increasing the flow bypassed through governor valve assembly 143 to boost. A power turbine overspeed device is provided to cause fuel to be bypassed to boost by causing valve member 149 to move away from shoulder 150 thereby making ineffective the power lever demand for high fuel flow delivery to the engine. A second speed pressure transducer (not shown) which can be similar to transducer 17 is provided, said second transducer drive mechanism is coupled to the power turbine to provide a pressure that is a function of power turbine speed. The power turbine speed signal is introduced to cavity 154 of housing 108 via passageway 155 containing therein fixed area restriction 156. Diaphragm 157 affixed to valve spool 158 separates cavity 154 from cavity 159. Helical compression spring 160 positioned in cavity 159 urges diaphragm 157 toward cavity 154. Metering spool 161 of start-idle nozzle position schedule valve 161a is partially disposed in cavity 164 and has a roller end 162 thereon. Helical compression spring 163 positioned coaxial spool 161 urges spool 161 to track cam 153, thereby controlling flow from cavity 164 to conduit 165 and cavity 159 via interconnected restriction 166. Cavity 159 incorporates a fixed area restriction 167 referenced to tank pressure on the downstream side thereof. An equilibrium position of diaphragm 157 and valve spool 158 which is upset either by a decrease in pressure in cavity 159 or an increase in speed signal pressure in cavity 154 will produce a downward motion of valve spool 158. Downward motion of valve 158 will meter servo supply fuel introduced at port 210 to passageway 168 via a fixed area restriction 169 to boost pressure. Pressure in passageway 168 approaching servo supply pressure will overcome the preload of reset spring 151 against valve member 149 thereby causing valve 149 to move away from shoulder 150 to make motion of cam 153 ineffective to control speed until the power turbine speed signal pressure is reduced sufficiently to permit spring 160 and spring 211 to urge valve spool 158 to a position restricting flow to passageway 168. The shifting of valve spool 158 controls the pressure in cavity 159 by venting or closing conduit 165 to boost pressure across solenoid operated retard valve 194. Retard valve 194 includes a housing 195 having a valve seat 196 formed therein. A solenoid coil 197 located in housing 195 is connected to an external electrical source to produce a force field to drive core member 198 against bias spring 199 to thereby lift core member 198 and interconnected valve 200 away from seat 196. A similar solenoid 201 is mounted to housing 108 such that core connected plunger 202 urges lever 147 towards valve member 142 when de-energized, thereby reducing bypass flow to boost and increasing compressor turbine speed to a high idle setting. When solenoid 201 is energized, plunger 202 retracts; bypass flow is increased, and a lower compressor turbine idle speed results. Servo pressure is supplied to conduit 203 leading to passageway 204 and annular cavity 205 in housing 108 via area restriction 206. Annular relief 207 on valve member 142 produces an annular passageway connecting annular cavity 205 with cavity 208 located downstream thereof to provide low bypass flow positions of valve member 142. Cavity 208 is in fluid communication with conduit 138 connected to pressure selector valve 130.

Valve spool 158 engages retainer 212 of spring 211 at a valve underlap or dead band position such that flow from passageway 210 to passageway 168 is prevented by the lands of valve 158. Further movement of a given increment by spool 158 requires a disproportionately large increase in power turbine speed signal pressure in cavity 154 to overcome the preload supplied by spring 211. Fluid in conduit 139 bleeds to boost across spool valve 158 at low values of pressure in cavity 154 when valve 158 and spring retainer 212 have a gap therebetween.

Cavity 136 in pressure selector valve 130 is fluidly interconnected with port 215, conduit 216, filter screen 217, port 218 and cavity 219 located within housing 220 of power turbine nozzle actuator, shown generally at 221. Cavity 219 is separated from cavity 222 by diaphragm 223 affixed thereto. Disk 224 has a flow restrictive aperture 225 therethrough and a projection 226 thereon. Cavity 222 is always referenced to boost pressure, hence aperture 225 provides a bleed means to prevent hydraulic lock of the pressure selector valve which otherwise would occur when the highest pressure input valve 130 began to decrease. Lever 227 pivotably mounted at one end has adjustably affixed to the other end stop member 228 and servo spool 229; the connection to said other end being sufficiently flexible to prevent significant side loads from being applied to spool 229 as lever 227 moves about its pivot point under the influence of the combined forces exerted by position feedback piston 231 and spring 230, and the opposing force produced by the pressure difference across diaphragm 223. Pump discharge flow via conduit 16 is introduced to passageway 232 in housing 220 and thence to annular cavity 233 formed between a pair of lands on valve 229. Differential area piston 234 is axially slideably mounted in bore 235 of housing 220 thereby forming large area variable volume cavity 236 and small area variable volume cavity 237, said cavities alternately being placed in fluid communication with cavity 223 by passageways 238 and 239 respectively. Piston 234 has a rod 240 affixed thereto, said rod being operably connected to a power turbine nozzle positioning apparatus (not shown), and to a nozzle position feedback shaft 241 suitably journaled and having affixed thereto a cam 242 tracked by a roller affixed to position feedback piston 231 under the influence of spring 230 and boost pressure in cavity 222. This is a closed loop force feedback servo system where piston 234 position is proportional to the pressure difference across diaphragm 223.

Pressure selector valve 130 receives three input pressure signals via conduits 131, 132 and 133 and transmits only the highest sensed pressure via interconnected chamber 136 and conduits 215, 216 and 218 to the β position actuator servo input diaphragm 223. The β actuator 221 provides turbine nozzle position as a function of pressure applied to diaphragm 223 via chamber 219. The β command pressure in chamber 219 operates servo valve 229 which ports fuel to actuator 234 to position the nozzles. Actual β position is fed back via cam 242 to null the servo valve by a force balance between input command pressure and the force of spring 230 acting on lever 227 connected to servo valve 229.

As shown in FIGURES 2A and 2B, the metered flow to the gas generator is accomplished by three orifices ($A_1$, $A_2$ and $A_4$) in series and a fourth orifice ($A_3$) is parallel therewith.

Where:

$A_1$ is the variable orifice area as set by the regenerator temperature probe $A_2$ is the variable orifice area set by the compressor inlet temperature probe $A_3$ is the variable area set by the enrichment valve $A_4$ is the variable area set by the ambient pressure probe.

It has been found that for the selected performance levels of the requisite applications, the general metered flow equation can be stated as follows:

$$W_F = K_1 \sqrt{P_F - P_M} \left( \frac{A_1 A_2 A_4}{\sqrt{(A_1 A_2)^2 + (A_1 A_4)^2 + (A_2 A_4)^2}} + A_3 \right)$$

where:

$K_1$ is heating value constant for the fuel utilized.

$A_1$ is the orifice area at valve 84 as set by the regenerator temperature probe.

$A_2$ is the orifice area at valve 111 as set by the $T_1$ transducer and biased to the hot day schedule in the starting to idle speed regime.

$A_3$ is the orifice area at valve 45 as set by the enrichment valve.

$A_4$ is the orifice area at valve 174 as set by ambient pressure transducer.

$\sqrt{P_F - P_M}$ is the metering head established by the metering head regulator.

OPERATION

To facilitate a better understanding of the principal problems solved by the instant invention, a brief summary of the essential operational features of the control system and the functions of each operation is presented herewith.

Figure 4:
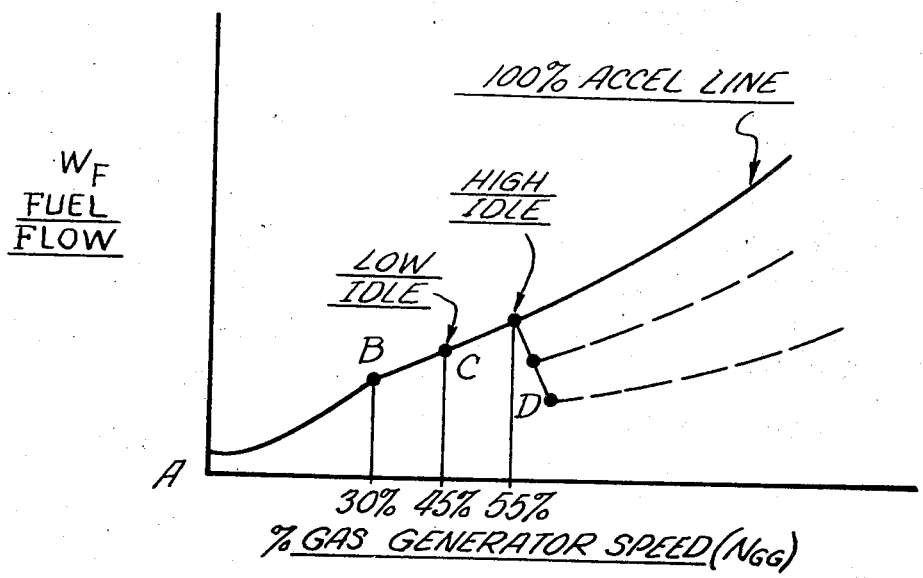

*Start-low idle condition.*—During the start operation, it is desired to supply fuel to the gas generator in accordance with the A to B portion of the fuel flow-speed curve as shown in FIG. 4. Referring generally to FIG. 3, at engine start the ignition key is turned on thereby energizing retard solenoid, shown generally at 194. Referring to FIG. 2B, when the retard solenoid is energized, the retard valve and plunger 196 is retarded, thereby connecting conduit 165 via chamber 200 to boost pressure. The power lever 254 is normally positioned on the low idle stop during the start operation by the operation of power lever retaining spring 256. When the power lever 254 is positioned on the idle stop, cam 153 fixedly connected to the power lever 254 by interconnected shaft 255 is positioned such that roller 162 of valve 161 is urged into engagement with the low rise contour surface of cam 153 under the influence of the tracking force supplied by spring 163. In this position, start-idle beta schedule valve 161A is closed.

The pressure in chamber 159 of power turbine max speed governor is at substantially tank pressure since chamber 159 is simultaneously and independently connected to conduit 165 via first intermediate fixed restriction 166 and to tank pressure via a second intermediate fixed restriction 167. At the start of engine operation the pressure to chamber 159 through the first intermediate fixed restriction 166 is somewhat less than boost pressure but greater than the turbine power speed pressure signal in chamber 154. Thus spring 160 urges the power turbine speed regulator valve 158 to the full open position. With the start-idle valve 161 in the closed position, fluid at servo pressure ($P_s$) is conveyed through fixed restriction 250, via interconnected chamber 164 and conduit 139 to valve 158 and thence returned to the pump at boost pressure ($P_b$). Valve 158 at the full open position is contoured to provide a preselected restriction in conduit 139 such that a pressure of preselected magnitude (approx. 70 p.s.i.) is formed in conduit 139 and transmitted to chamber 136 of pressure selector valve 130 such that turbine nozzle actuator 234 positions the turbine nozzles at the preselected turbine nozzle start angle. As the gas generator starts, pump 1 starts to pump fluid through the metering system via interconnected conduits 3, 80, 87, 171, 179 and 54. Pressurizing valves 180 and 193 block the flow of fluid downstream of the aforementioned interconnected conduits until a pressure sufficient to overcome the force of springs 185 and 200 has been generated. This initial action of the pressuring valves assures a minimum servo pressure is supplied to the control servo supply regulator 6 prior to the delivery of metered fuel to the gas generator combustor. Servo pressure is supplied through fixed restriction 251 to speed pressure switch 40 via conduit 118 and thence through conduit 77 to chamber 71 and variable bleed valve 79. The pressure in chamber 71 acts on valve 72 to generate a force that opposes the force of spring 73 to establish the gas generator fuel flow regulated metering head pressure during start-up. Fuel flow schedule from point A to B, as shown in FIG. 4, is defined by the magnitude of the bias pressure in conduit 77, as established by the adjustment of variable bleed valve 78.

Servo pressure is admitted to conduit 113 through fixed restriction 252 at the same instant it is admitted through restriction 251. The pressure in conduit 113 is conveyed to chamber 125 and imposed on valve 105 to generate a force that is greater than the force of spring 99, thus forcing valve 105 against stop 109. Contoured valve 112 in engagement with valve 105 is forced to the full-up position by the action of spring 110 and pressure in chamber 126. The contoured surface of valve 112 in the full-up position presents a minimum restriction between conduit 120 connected to boost pressure via valve 112. At start-up speed, speed pressure transducer 17 generates a relatively low pressure that is further reduced in conduit 120 by the action of fixed restriction 42 and valve 112. Thus during start-up, the pressure conveyed by conduit 120 via conduit 131 to chamber 136 of pressure selector valve 130 is lower than the pressure in conduit 139. Also during start-up, the T₂ transducer is maintained against stop 109 thus providing the so-called "hot day" (approx. 100° F.) fixed acceleration fuel flow curve shown generally in FIG. 4, and particularly from points B to D on said curve. Also during start-up lever 148 is positioned on the low contour slope of cam 153 by cam follower 152 such that the force generated in chamber 253 by boost pressure acting on valve 144 is sufficient to overcome the force of governor spring 146 and move valve 142 such that the upper land of valve 142 blocks chamber 205 to prevent fluid at servo pressure from being transmitted from conduit 204 to conduit 138. Hence the fluid in conduit 138 is at boost pressure. Accordingly, the pressure transmitted to chamber 136 of selector valve 135 by conduit 138 via conduit 132 is boost pressure. Thus at start-up, the pressure transmitted to the pressure selection valve by conduit 139 via conduit 133 is the highest; this is the pressure transmitted by pressure selector valve 130 to nozzle actuator 221 via interconnected conduits 215, 216 and 218. Nozzle actuator system 221 is so constructed that each discrete pressure in 219 represents a single discrete fixed nozzle angle position.

The pressure in chamber 154 of power turbine speed governor is supplied via interconnected fixed restriction 156 and conduit 155 by a speed pressure transducer (similar to the one shown generally at 17) secured to the power turbine output shaft such that said pressure transducer generates a pressure as a function of power turbine output speed. The pressure in chamber 154 acts on diaphragm 157 to generate a force that opposes the force of spring 160 to move valve 158 in accordance with the magnitude of the pressure in chamber 154. The movement of valve 158 varies the magnitude of the restriction in conduit 139 and hence the magnitude of the pressure conveyed to nozzle actuator assembly 221. The contour of the lower portion of valve 158 is so constructed as to maintain the power turbine at a preselected idle speed by varying the angle of the power turbine nozzle. Thus at engine start, valve 158 provides a preselected fixed restriction that generates a preselected pressure such that the variable power turbine nozzles are scheduled to the preselected start angle, as shown in FIGS. 5 and 11; and then as the engine speed increases valve 158 varies the pressure to β actuator 221 to control the power turbine speed independent of the gas generator speed at the preselected low idle speed by varying the angle of the variable position power turbine nozzles to maintain the preselected power turbine speed for a selected narrow range of power lever movement from the low idle position.

*High idle condition*—It is well known that gas turbine power plants require considerable time to accelerate from idle to the full power. Accordingly, the gas generator in the instant engine is provided with means to increase its speed when an imminent power utilization condition is indicated. This condition is the so-called "high idle" condition. Referring generally to FIGURES 2A and 2B, when power utilization is imminent the selector lever is moved from the "idle" to the "drive" position, thereby de-energizing high idle solenoid 201. When high idle solenoid 201 is de-energized, spring 258 urges plunger 202 into engagement with retainer 147 and compress spring 146 independent of the action of lever arm 148 to thus increase the force on valve 142. This increased force on valve 142 shifts valve 142 downward to a preselected position such that the contoured surface 144 of valve 142 presents a greater restriction and hence increases the metered fuel flow to the gas generator with a resultant increase in gas generator speed to the "high idle" speed. The increase to the "high idle" condition is represented in FIG. 4 as the change from point C to point D. This change is defined by the magnitude of the increase of the force on spring 146 created by the de-energization of the high idle solenoid 201 to thus reduce the bypass flow of governor valve 142. This "high idle" condition increases the gas generator speed just prior to the application of power by the turbine and hence reduces the engine acceleration time.

*Constant speed governing and fuel metering operation*— As the gas generator speed increases from the start condition, the pressure ($P_n$) produced by the speed pressure transducer 17 increases. The pressure ($P_n$) which is a function of the square of the gas generator speed is discharged through conduit 38 into interconnecting conduit 39 where it is transmitted to chamber 70 of metering head pressure regulator valve 41 and simultaneously to one face of land 115 of speed pressure switch 40. The increase of pressure ($P_n$) with increase in speed causes the force acting on one face of land 115 to increase and overcome the force of spring 102 to move land 115 axially to the position where the flow of fluid from conduit 118 to conduit 77 past land 115 is blocked. When land 115 blocks conduit 118, the pressure in conduit 77 is reduced to boost pressure while the pressure in conduit 118 is elevated to servo pressure which is transmitted via conduit 118 to chamber 186 of pressurizing valve 180 and chamber 258 of pressurizing valve 193. The introduction of servo pressure to pressurizing valves 180 and 193 increases the level of the minimum supply pressure available to operate the nozzle actuator from the initial start condition value. The increase in the minimum actuator pressure level occurs at Station B, as shown in FIG. 4. As the gas generator speed continues to increase, land 117 of the speed pressure switch valve is axially displaced to the point where conduit 119 is placed in fluid communication with conduit 113. The fluid interconnection of conduits 113 and 119 permits the same pressure introduced into conduit 113 via fixed orifice 252 in conduit 114 to be simultaneously introduced into chambers 125 and 100, thus producing a pressure and force balance on valve 105. The pressure in chamber 126 generates a force on valve 111 which in combination with the force of spring 110 balances the force of compound springs 99 and 106 to initially retain valves 112 and 111 in operative association with valve 106 in the "hot day" position against stop 109. A change in compressor inlet temperature will cause the bimetallic element of the compressor inlet sensor 94 to be displaced, thus rotating arm 96 to depress element 97 and valve 98 to thereby increase the compression of springs 99 and 106 to force valves 112 and 111 to move downward and thus vary the restriction between conduits 87 and 171 and conduit 120 and the boost pressure port. The interconnection between conduits 119 and 113 occurs at the high idle speed condition shown as Station D in FIG. 4, and the effect on metered fuel flow for a decrease in compressor inlet temperature with all other conditions remaining constant is depicted by the family of curves starting at Station D in FIG. 4. Simultaneous with the application of the gas generator speed transducer pressure ($P_n$) to speed pressure switch 40, the same pressure ($P_n$) is applied to chamber 70 of the metering head pressure regulator 41. The pressure ($P_n$) in chamber 70 generates a force on valve 58 that in conjunction with the force of spring 73 transmitted to valve 58 via plunger 68 opposes the force generated by the pump outlet pressure ($P_F$) transmitted to the opposite end of valve 58 via conduit 57. Valve 58 is positioned responsive to the magnitude of the forces acting on the opposite ends thereof to establish the pressure drop across the metering orifice. The magnitude of the metered pressure in conduit 3 is dependent upon the position of metering valve 58 which in turn is positioned responsive to speed pressure transducer output pressure ($P_n$) which is a function of the square of the gas generator speed.

A variable area orifice is positioned in series flow relationship with the outlet of pump 1 and is fluidly connected to pump 1 by interconnecting conduits 3 and 8. A valve 85 with a contoured land 84 is positioned in the orifice such that axial movement of the valve will produce a variable area in the orifice. Spring 88 is positioned at one end of valve 85 to create a force that is opposed by a lever arm positioned on the opposite end of valve 85 and pivotably attached to an adjusting mechanism 91. A temperature sensor 93 senses the temperature of the working medium upon discharge from the regenerator and is operatively associated with link 89 to vary the area of the discharge orifice as a function of regenerator discharge temperature.

A second variable orifice is positioned in series flow relationship with the output of valve 85 and is fluidly connected to valve 85 by means of conduit 87. Valve 111 is positioned in the second variable orifice such that axial movement of valve 111 will produce a variable area in said second orifice. Valve 111 is axially moved by a variation in compressor inlet temperature to vary the restriction between conduits 87 and 171 to vary the area of said second orifice as a function of compressor inlet temperature.

A third variable area orifice is positioned downstream of said second orifice in series flow relationship with said first and second variable area orifices. A change in ambient pressure will cause bellows 172 to be displaced, thus pivotably rotating arm 173 in operative association with valve 174 to force valve 174 to be axially displaced and thus vary the restriction between conduits 171 and 179. The displacement of bellows 172 causes valve 174 to vary the area of the third variable area discharge orifice as a function of ambient pressure.

The pressure ($P_n$) generated by the speed pressure transducer 17 is transmitted to conduit 120 through fixed orifice 42 and is simultaneously transmitted to valve 112 and chamber 141 via interconnected conduit 120. Valve 112 varies the restriction between conduit 120 and the boost pressure port responsive to variations in compressor inlet temperature to generate a pressure ($P_{NT}$) in conduit 120 that is a function of the square root of the compressor inlet pressure. Thus, the pressure ($P_{NT}$) is a function of corrected gas generator speed. The pressure ($P_{NT}$) is transmitted to chamber 141 of the governor valve and is impressed on diaphragm 145 to generate a force that is balanced by the force of governor spring 146. The governor actual speed signal ($P_{NT}$) is compared with the desired speed as determined by the pre-load of governor spring 146 as set by the power lever 254. When actual speed exceeds the set speed, the force unbalance on the governor valve 142 causes it to open and bypass metered flow from conduit 90 past contoured valve 144 to chamber 253 as a function of speed error. Conversely, valve 142 closes and the first, second and third variable orifices in series generate a variable orifice area responsive to selected variable engine parameters, and the metering head pressure regulator 41 mains a regulated pressure across the composite variable orifice area as a function of the gas generator speed such that the composite of the control metering section always maintains a fuel flow at the acceleration level dictated by the engine parameters. In the case of the instant control, a family of straight line curves with each curve representing a specific function of $\beta$ can be superimposed on the curve of FIG. 8. The resulting composite curve presents a format whereby a value of $\beta$ and $T_7/T_1$ is determined for each value of corrected speed $N/T_1$ to establish the basis for generating the metered flow equation set forth as Equation 19. The governor valve 142 merely diverts part of this metered flow to pump inlet as determined by the power lever position and the gas generator speed.

During normal speed governing and fuel metering operation, start-idle beta schedule valve 161 is open, thus connecting chamber 164 to conduit 165. Retard solenoid 194 is energized; thus conduit 165 is connected to chamber 200 which is in fluid communication with the boost pressure port. Hence, servo supply pressure entering chamber 164 through fixed orifice 250 is communicated to boost pressure via interconnected chamber 164, conduit 165 and chamber 200 such that the pressure in conduit 139 is at substantially boost pressure. Similarly, the upper land of governor valve 142 blocks conduit 203 such that the pressure maintained in conduit 138 is boost pressure which is transmitted to conduit 138 via fixed orifice 138A. The corrected speed pressure present in conduit 120 is communicated via interconnecting conduits 120 and 131 to chamber 136 of pressure selector valve 135. Since the pressure in conduit 131 is higher than the pressure in conduits 132 and 133, pressure selector valve 135 transmits the pressure in conduit 131 via interconnected chamber 136, conduits 216, 218 and chamber 219 to diaphragm 223 of nozzle actuator 221 such that actuator 234 positions the nozzles in the most economical operating position for each value of gas generator speed. The range of nozzle positions for the normal speed governor fuel metering range are shown from Stations A to B of FIG. 5, and Stations H to J of FIG. 6.

*Acceleration.*—The power lever 254 may be advanced at an extremely rapid rate such that lever 148 by the action of cam 153 compresses governor spring 146 in such a rapid manner that governor valve 142 is almost instantly moved downward to its minimum bypass condition. This rapid increase in the magnitude of the metered flow conducted through conduit 192 to the combustion chamber of the engine will cause the gas generator to start to accelerate. However, the inertia of the gas generator is such that the gas generator turbine cannot be rapidly accelerated. Thus, to aid in the acceleration of the engine, the variable turbine nozzles are positioned at a single preselected acceleration angle calculated to best assist compressor turbine acceleration over a wide range operating conditions. When the rapid movement of power lever 254 causes governor valve 142 to be rapidly moved downward, the upper land of governor valve 142 is moved downward to a position such that conduit 203 is fluidly connected to conduit 138 via interconnected chambers 205 and 208 such that servo pressure enters fixed orifice 206 and is conducted to conduit 138 and thence to fixed orifice 138A. The fixed areas of orifices 206 and 138A are preselected such that when supply pressure is introduced into fixed orifice 206, a predetermined pressure is established in conduit 138 which is communicated via interconnected conduit 132 to chamber 136 of pressure selector valve 135. The magnitude of the preselected pressure in conduit 132 is greater than the governor speed pressure present in conduit 131 and the boost pressure in conduit 133; thus pressure selector valve 135 communicates the pressure in conduit 132 via interconnected chamber 136, conduit 216, conduit 218 and chamber 219 to diaphragm 223 to position nozzle actuator 234 to the preselected single acceleration nozzle angle. The engine acceleration nozzle angle is shown from Stations C to D of FIG. 5, and Stations F to G of FIG. 6.

*Power turbine max speed override governor.*—The pressure ($P_{pt}$) which is a function of power turbine speed is conducted through interconnected fixed orifice 156 and conduit 155 to chamber 154 to engage diaphragm 157 to thereby generate a force on valve 158. The force generated by the power turbine speed pressure in chamber 154 is initially opposed by the force of spring 160. When valve 158 has been moved downward a preselected distance, the force of spring 160 is supplemented by the force of spring 212. At a preselected power turbine speed, the force generated by the pressure in chamber 154 will overcome the combined opposing forces of spring 160 and spring 211 such that the upper land of valve 158 will be moved downward to a position whereby conduit 210 is connected to conduit 168, thus transmitting servo supply pressure via interconnected conduit 210 and conduit 168 to valve 149. The servo pressure in conduit 168 is exhausted through fixed orifice 169 to boost pressure such that a pressure of sufficient magnitude is generated to create a force on valve 150 sufficient to compress spring 151 and pivotably move lever 148 to reduce the compression on governor spring 146 and thus decrease the metered flow to the gas generator. Hence, in response to a preselected maximum power turbine speed, the power turbine governor valve 150 will override the gas generator speed selector cam 153 and linkage 148 to reduce the gas generator speed and to thereby establish the preselected power turbine speed as a maximum overriding governor speed condition.

*Retarding and braking operation.*—During normal speed governing and fuel metering operation of the engine, the power lever 254 is positioned at some angle intermediate the low idle and max power stops. The power lever 254 fixedly connected to cam 153 by means of interconnected shaft 255 is so constructed that rotation of power lever 254 intermediate the low idle and max stop will simulanteously move cam 153 to position roller 162 of valve 161 into engagement with the high rise contour surface of cam 153, such that valve 161 is open. With valve 161 open, servo supply pressure ($P_s$) is transmitted through fixed orifice 250 into conduit 165 and thence into chamber 200 such that the pressure in conduit 135 is substantially boost pressure ($P_b$). Simultaneously, the pressure in chamber 154 which is a function of power turbine speed has increased with the increase in power turbine speed to the point where the pressure acting on diaphragm 157 is of a magnitude sufficient to override the force of spring 160 and move valve 158 downward to block conduit 139 from the boost pressure port. Since the power turbine is connected to the gas generator only by means of a fluid coupling, very little braking force is provided by a free power turbine configuration. Accordingly, on certain ground vehicle applications, it is desired to increase the braking effect of the free power turbine during power lever retardation and downhill braking operations. When the rotative force is removed from the power lever 254, spring 256 will return power lever 254 to the low idle stop position. Movement of the power lever 254 to the idle stop position will rotate cam 153 to a position such that valve 161 is closed. The pressure in conduit 139 rises to servo supply pressure when valve 164 and valve 158 are closed. The pressure in conduit 139 is transmitted through pressure selector valve 136 to nozzle actuator 221 such that the actuator and consequently the variable power turbine nozzles are moved to the full retard angle position. Should additional braking or retardation force be desired, such as in downhill operation where it is desired to utilize the engine as a braking means to retard the forward speed vehicle, the retard solenoid 194 is de-energized. De-energization of the retard solenoid causes spring 199 to urge solenoid valve 196 into sealing engagement with housing 195 such that chamber 200 and fluidly connected conduit 165 are blocked from the boost pressure port. The power lever 254 can be moved to the increase power position to increase the force on spring 146 and thus move governor valve 142 downward to increase the metered flow to the gas generator. The movement of power lever 254 to the increase position will simultaneously open valve 164. However, with the retard solenoid 194 de-energized, conduit 165 is blocked by valve plunger 196, and conduit 139 is blocked by valve 158; thus the pressure in conduit 139 will remain at servo supply pressure to thereby maintain the variable position power turbine nozzles in the full brake position, but will permit the gas generator speed to be increased, thus permitting the retarding force exerted on the power turbine to be increased.

What I claim is:

1. In combination with a gas generator having a regenerator and means for discharging the combustion gas of the gas generator successively through a variable geometry nozzle assembly, a free power turbine and a regenerator, a fuel, speed and variable nozzle position control comprising:
    power selecting means for selecting a desired gas generator operating condition:
    actuator means for positioning said variable geometry nozzles;
    metering means functionally connected to said actuator means to cojointly establish a preselected, prescheduled rate of metered fuel to said gas generator and a preselected, prescheduled position of said variable nozzles responsive to each variation of said power selecting means.

2. In combination with a gas generator having a regenerator and means for discharging the combustion gas of the gas generator successively through a variable geometry nozzle assembly, a free power turbine and a regenerator, a fuel, speed and variable nozzle position control comprising:
    power selecting means for selecting a desired gas generator operating condition;
    actuator means for positioning said variable geometry nozzles;
    metering means functionally connected to said actuator means to cojointly establish a preselected, prescheduled rate of metered fuel to said gas generator and a preselected, prescheduled position of said variable nozzles responsive to each variation of said power selecting means;
    including means for automatically modifying each metered fuel rate in accordance with a function of the product of the gas generator speed and the temperature of the compressed fluid leaving said regenerator so that the temperature of the gases entering the turbine of said gas generator never exceed a preselected maximum limit.

3. In operative association in a gas turbine engine including variable position nozzles interposed between a compressor turbine and a free power turbine and having a compressor supplying compressed fluid through a heat regenerator to a fuel combustion chamber, control means comprising:

power selecting means for selecting a desired gas turbine operating condition;

metering means for metering fuel flow to said engine combustion chamber;

actuator means for positioning said variable position nozzles;

computer means functionally connected to said metering means and said actution means to cojointly modify prescheduled fuel flow and vary prescheduled nozzle position responsive to each variation of said power selecting means.

4. In operative association with a gas turbine engine comprising a first gas turbine driving a compressor for supplying compressed air through a regenerator to a combustion chamber, a free power turbine in series gas flow relation between said first turbine and said regenerator, variable geometry nozzles interposed in series gas flow relation between said first turbine and said power turbine, a fuel, speed and nozzle position control comprising:

power selecting means for selecting a desired operating condition of said gas turbine;

means for sensing a plurality of engine parameters;

actuator means for positioning said variable geometry nozzles;

fuel governing means for controlling the fuel flow to said turbine as defined by said power selecting means;

calculating means functionally connected to said fuel governing means and said actuator means to cojointly vary the prescheduled rate of fuel flow and the prescheduled position of said variable position nozzles responsive to variations of said power selector means, including fuel metering means to automatically vary the maximum rate of metered flow responsive to said plurality of sensed engine parameters so that the speed of said compressor never exceeds a preselected maximum limit.

5. In combination with a gas generator having a regenerator and means for discharging the combustion gas of the gas generator successively through a variable geometry nozzle assembly, a free power turbine and a regenerator, a fuel, speed and variable nozzle position control comprising:

power selecting means for selecting a desired operating condition of said gas turbine;

means for sensing a plurality of engine parameters;

actuator means for positioning said variable geometry nozzles;

fuel governing means for controlling the fuel flow to said turbine as defined by said power selecting means;

calculating means functionally connected to said fuel governing means and said actuator means to cojointly vary the prescheduled rate of said fuel flow and the prescheduled position of said variable position nozzle responsive to variations of said power selector means, including fuel metering means to automatically vary the maximum rate of metered flow responsive to said plurality of sensed parameters so that the speed of said compressor never exceeds the speed of preselected maximum limit; said power selecting means including:

means for manually selecting a desired compressor operating speed;

means for receiving a signal of corrected actual compressor speed;

means functionally connected to said fuel governing means and said compressor speed signal receiving means to modify fuel flow in response to deviations of compressor speed from the selected operating speed;

means for receiving a signal of actual power turbine rotational speed;

means for disassociating said compressor speed signal during turbine start;

means coacting with said disassociating means and said power turbine speed signal receiving means to position said actuator means to thereby control power turbine speed independent of said fuel governing and metering means during turbine start.

6. The apparatus of claim 5 wherein said plurality of sensed engine parameters comprises:

means for sensing the value of and producing signals proportional to the temperature adjacent the compressor inlet, the pressure adjacent the compressor inlet, the compressor rotational speed, the regenerator outlet temperature and the free power turbine rotational speed.

7. The apparatus of claim 6 wherein said fuel metering means comprises:

a plurality of variable area means in combination with metering head means coordinated to receive signals proportional to regenerator outlet temperature, compressor inlet temperature, compressor inlet pressure and compressor rotational speed and responsive to said received signals meter the maximum fuel flow to said gas generator in accordance with the equation:

$$W_F = K_1 \sqrt{P_F - P_M} \left( \frac{A_1 A_2 A_4}{\sqrt{(A_1 A_2)^2 + (A_1 A_4)^2 + (A_2 A_4)^2}} \right)$$

wherein ($W_F$) is the rate of fuel flow, (K) is a preselected constant, $\sqrt{P_F - P_M}$ is the metering head as a function of compressor speed, $A_1$ is variable areas as a function of regenerator outlet temperature, $A_2$ is variable areas as a function of compressor inlet temperature, $A_4$ is variable area as a function compressor inlet pressure.

8. The apparatus of claim 7 wherein said calculating means comprises:

means for generating a pressure signal proportional to compressor speed;

means for modifying said compressor speed pressure to generate a corrected compressor speed pressure signal;

means for cojointly modifying the action of the metering head means, the fuel governing means and the nozzle actuator means in accordance with the compressor speed pressure signal so that said variable geometry nozzles are positioned at a preselected angle for each condition of turbine operation.

9. A fuel and variable position nozzle control for a gas turbine engine having a compressor directly connected to a first turbine, a regenerator and a combustion chamber between the compressor and the first turbine, a free power turbine in series flow relation with the first turbine and variable geometry nozzles between the first and free power turbines, comprising:

means for varying the engine power level;

means sensing a plurality of engine parameters and generating signals proportional thereto;

means metering a maximum preselected fuel flow to said combustion chamber in accordance with a preselected composition function of said plurality of engine parameters;

means modifying said metered fuel flow responsive to positional changes of said power level varying means to control selected compressor speed;

means for positioning said variable geometry nozzles means comprising a series of hydraulic components functionally connected to said power level varying means, said metering means and said nozzle positioning means such that said metering means and said nozzle positioning means coact to provide a coordinated preschedule fuel flow and nozzle position as a function of the position of said power level varying means; said means for varying the power level including:

means positioned responsive to a pressure signal received as a function of actual power turbine rotational speed;

speed selecting means for selecting a desired operating speed of said turbine engine;

means responsive to movement of said speed selecting means and functionally connnected to said power turbine speed responsive means for modifying a working pressure such that during turbine start, said variable nozzles are positioned responsive to power turbine speed controlled working pressure to thereby control power turbine speed solely by means of nozzle position; and during speed selector means retard operation said variable nozzles are moved to a preselected braking position responsive to a working pressure controlled by said working pressure modifying means.

10. The apparatus of claim 9 wherein the means for varying the power lever additionally comprises:

pressure responsive means operatively associated with said speed selecting means;

a working fluid functionally connected to said pressure responsive means and said power turbine speed responsive means such that responsive to a preselected power turbine speed said working fluid positions said pressure responsive means to override said speed selecting means and limit the speed of said power turbine.

11. The apparatus of claim 10 wherein the means for varying the power level further comprises:

speed selecting valve means functionally connected to said metered fuel flow modifying means and a plurality of working pressures to control more than one working pressure such that the magnitude of the single largest working pressure is communicated to said nozzle varying means to move said variable nozzles to a preselected position during engine acceleration.

12. The apparatus of claim 9 wherein said coordinated hydraulic components comprises:

a plurality of independent working pressures;

a pressure selector valve controlling the receipt of said plurality of working pressures to transmit the high single valued pressure to said nozzle varying means;

a speed transducer generating a pressure as a function of compressor speed;

a pressure sensitive switch operated by said compressor speed pressure to control a plurality of said working pressure at reduced level during turbine start.

13. The apparatus of claim 12 wherein said means for varying power level comprises:

a power lever for setting the desired turbine operating condition;

a first diaphragm operated valve positioned responsive to a power turbine speed pressure signal;

a stop valve positioned responsive to movement of said power lever;

a second diaphragm operated valve positioned responsive to a corrected compressor speed pressure signal and an opposing power lever generated spring froce;

a first working pressure in fluid communication with said stop valve, and the diaphragm and valve of said first diaphragm operated valve such that during turbine start said first working fluid is blocked to said diaphragm and is tarnsmitted to said first valve and a pressure selector valve to control power turbine speed solely by means of nozzle position; and said stop valve and said power turbine speed valve are positioned closed during retard operation to completely block the flow of said first working fluid such that said pressure of said first working fluid positions said variable nozzles to a preselected braking position;

a solenoid operated valve in fluid communication with said first working pressure deenergized to block the escape of said first working fluid pressure when the power lever is advanced to increase braking power during the retard operation;

a second working pressure in fluid communication with the valve of said second diaphragm operated valve such that during engine acceleration said second working fluid positions said variable nozzles to a preselected acceleration position.

References Cited

UNITED STATES PATENTS

| | | | |
|---|---|---|---|
| 2,625,789 | 1/1953 | Starkey | 60—39.25 X |
| 2,755,621 | 7/1956 | Terrell | 60—39.25 X |
| 2,912,824 | 11/1959 | Van Nest et al. | 60—39.25 X |
| 3,243,596 | 3/1966 | Loft | 60—39.25 X |

CARLTON R. CROYLE, Primary Examiner

U.S. Cl. X.R.

60—39.25, 39.51

PO-1050
(5/69)

UNITED STATES PATENT OFFICE
CERTIFICATE OF CORRECTION

Patent No. 3487482            Dated January 6, 1970

Inventor(s) John M. Maljanian

It is certified that error appears in the above-identified patent and that said Letters Patent are hereby corrected as shown below:

Column 4, line 20, after "schedule", insert -- responsive --

Column 4, line 49, after "acceleration", insert -- deceleration

Column 5, line 55, change "$WA\sqrt{T_1}$, to -- $\dfrac{WA\sqrt{T_1}}{P_1}$ --

Column 8, line 73, change "approaching" to -- approach --

Column 9, line 11, change "$\dfrac{WFA}{P_1 T_1} = f\,[(\dfrac{P_3}{P_1}) - \dfrac{T_5}{T_1}\,\dfrac{C_p}{H}]$", to -- $\dfrac{WFA}{P_1\sqrt{T_1}} = f\,[\dfrac{P_3}{P_1} - \dfrac{T_5}{T_1}\,\dfrac{C_p}{H}]$ --

Column 11, line 65, change "aperature", to -- aperture --

Column 11, line 69, change "aperature", to -- aperature --

Column 12, line 43, change "comproses", to -- comprises --

SIGNED AND
SEALED
JUN 30 1970

(SEAL)
Attest:

Edward M. Fletcher, Jr.
Attesting Officer

WILLIAM E. SCHUYLER, JR.
Commissioner of Patents